(12) United States Patent
Rhe et al.

(10) Patent No.: US 12,254,152 B2
(45) Date of Patent: Mar. 18, 2025

(54) TOUCH DISPLAY DEVICE

(71) Applicant: LG Display Co., Ltd., Seoul (KR)

(72) Inventors: Ruda Rhe, Seoul (KR); DeukSu Lee, Seoul (KR); JaeGyun Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/358,869

(22) Filed: Jul. 25, 2023

(65) Prior Publication Data

US 2024/0045540 A1    Feb. 8, 2024

(30) Foreign Application Priority Data

Aug. 4, 2022    (KR) .................. 10-2022-0097319

(51) Int. Cl.
| | |
|---|---|
| *G06F 3/041* | (2006.01) |
| *G06F 3/044* | (2006.01) |
| *H01L 27/32* | (2006.01) |
| *H01L 51/00* | (2006.01) |
| *G09G 3/3233* | (2016.01) |

(52) U.S. Cl.
CPC ........ *G06F 3/04164* (2019.05); *G06F 3/0412* (2013.01); *G06F 3/0446* (2019.05); *G06F 2203/04111* (2013.01); *G09G 3/3233* (2013.01); *G09G 2300/0842* (2013.01); *G09G 2300/0861* (2013.01)

(58) Field of Classification Search
CPC .................................................. G09G 3/3233
See application file for complete search history.

(56) References Cited

U.S. PATENT DOCUMENTS

| | | | |
|---|---|---|---|
| 8,994,673 B2 | 3/2015 | Hwang et al. | |
| 9,024,913 B1 | 5/2015 | Jung et al. | |
| 10,324,570 B2 | 6/2019 | Kimura et al. | |
| 10,845,906 B2 | 11/2020 | Li et al. | |
| 11,099,677 B2 | 8/2021 | Lee et al. | |
| 2015/0212548 A1* | 7/2015 | Namkung | G06F 3/0445 |
| | | | 345/173 |
| 2018/0151662 A1* | 5/2018 | Rhe | H10K 59/40 |
| 2019/0302934 A1* | 10/2019 | Rhe | G06F 3/047 |
| 2019/0302943 A1 | 10/2019 | Rhe et al. | |
| 2020/0019294 A1 | 1/2020 | Lee et al. | |
| 2020/0026384 A1* | 1/2020 | Rhe | G06F 3/0443 |

(Continued)

FOREIGN PATENT DOCUMENTS

| | | |
|---|---|---|
| CN | 112825018 A | 5/2021 |
| EP | 3674861 A1 | 7/2020 |
| JP | 2013122752 A | 6/2013 |

(Continued)

*Primary Examiner* — Nan-Ying Yang
(74) *Attorney, Agent, or Firm* — Seed IP Law Group LLP

(57) ABSTRACT

Embodiments of the disclosure may provide a touch display device in which in a structure in which touch electrodes are separately disposed in a first sub area and a second sub area of an active area, X-touch electrodes disposed in the first sub area and the second sub area are electrically connected with each other, and Y-touch electrodes are electrically separated from each other. It is possible to reduce the load by a structure in which touch electrodes are divided for each sub area and to reduce the number of channels by driving the X-touch electrodes in the first sub area and second sub area by the same number of channels.

19 Claims, 9 Drawing Sheets

(56) References Cited

U.S. PATENT DOCUMENTS

2022/0171499 A1  6/2022  Han et al.

FOREIGN PATENT DOCUMENTS

| JP | 2015210811 A | 11/2015 |
| JP | 2017130200 A | 7/2017 |
| JP | 2019530047 A | 10/2019 |
| TW | I677812 B | 11/2019 |

* cited by examiner

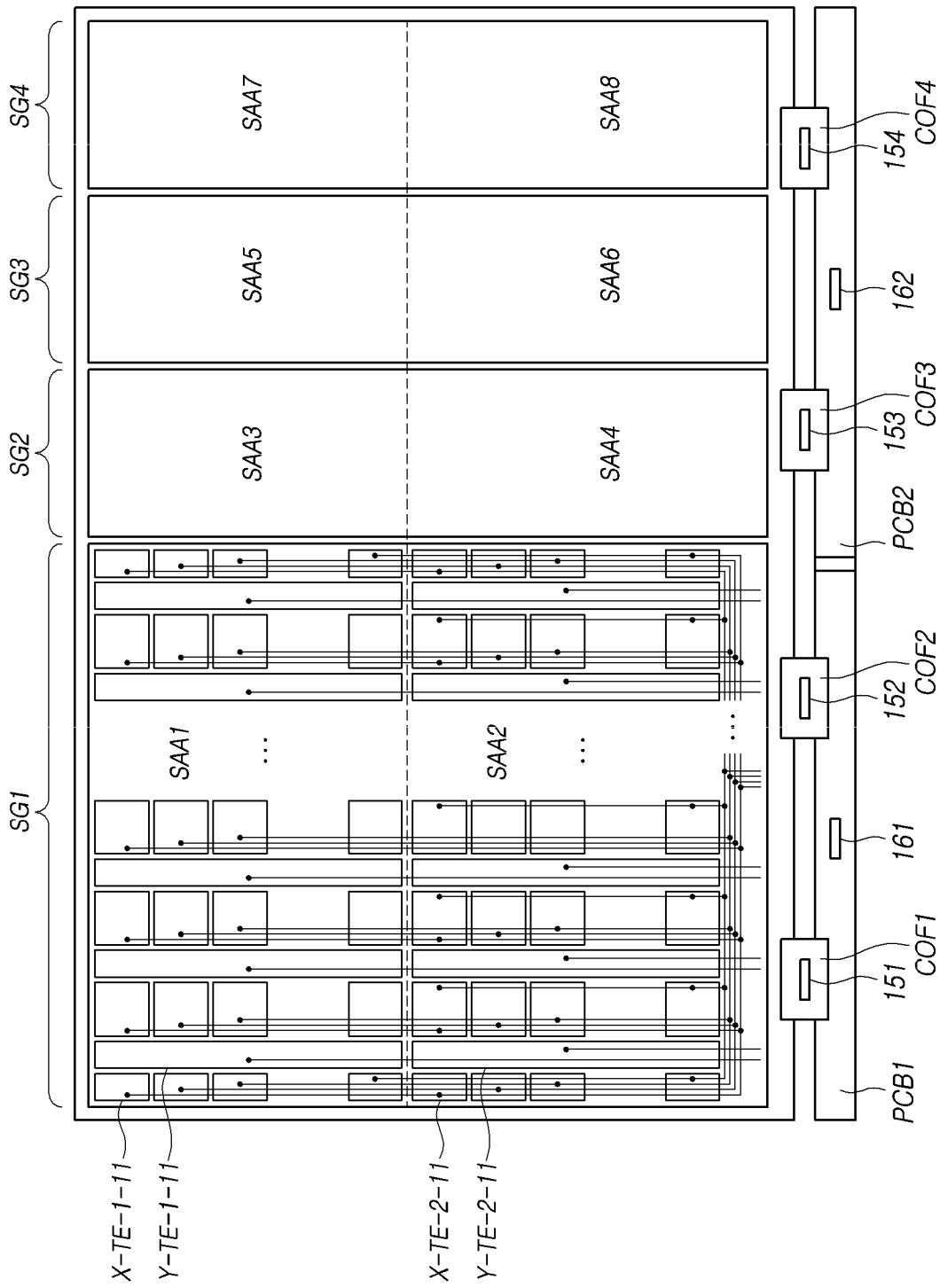

TOUCH DISPLAY DEVICE

CROSS-REFERENCE TO RELATED APPLICATION

This application claims priority from Korean Patent Application No. 10-2022-0097319, filed on Aug. 4, 2022, which is hereby incorporated by reference for all purposes as if fully set forth herein.

BACKGROUND

Technical Field

Embodiments of the disclosure relate to touch display devices.

Description of Related Art

The display device may recognize the user's touch on the display panel displaying images and provide a function of performing input processing based on the recognized touch.

The display device may include, e.g., a plurality of TOUCH electrodes positioned outside or inside the display panel. The display device may drive the plurality of touch electrodes, detect a change in capacitance when the user touches the display panel, and recognize the touch.

As the size of the display panel increases, the load of the touch sensor structure included in the display device may increase. Performance of touch sensing by the touch sensor structure may be degraded.

BRIEF SUMMARY

Embodiments of the disclosure may provide a method for enhancing touch sensing performance by a touch sensor structure of a display device including a large-area display panel.

Embodiments of the disclosure may provide a touch display device comprising a substrate including an active area including a plurality of sub areas and a non-active area positioned outside the active area, a plurality of light emitting elements on the substrate, an encapsulation layer on the plurality of light emitting elements, a plurality of touch electrodes positioned on the encapsulation layer and separately disposed in the plurality of sub areas, and a plurality of touch routing lines electrically connected with at least one of the plurality of touch electrodes.

The plurality of sub areas may include a first sub area and a second sub area.

At least one of a plurality of first X-touch electrodes positioned in the first sub area may be electrically connected with at least one of a plurality of second X-touch electrodes positioned in the second sub area.

A plurality of first Y-touch electrodes positioned in the first sub area may be insulated from a plurality of second Y-touch electrodes positioned in the second sub area.

Embodiments of the disclosure may provide a touch display device comprising a plurality of first X-touch electrodes and a plurality of first Y-touch electrodes positioned in a first sub area and a plurality of second X-touch electrodes and a plurality of second Y-touch electrodes positioned in a second sub area adjacent to the first sub area, wherein at least one of the plurality of first X-touch electrodes is electrically connected with at least one of the plurality of second X-touch electrodes, and wherein the plurality of first Y-touch electrodes are insulated or electrically separated from the plurality of second Y-touch electrodes.

Embodiments of the disclosure may provide a touch display device comprising a substrate including an active area where a plurality of subpixels are disposed and a non-active area positioned outside the active area, a plurality of light emitting elements on the substrate, an encapsulation layer on the plurality of light emitting elements, a plurality of X-touch electrodes and a plurality of Y-touch electrodes on the encapsulation layer, and a plurality of touch routing lines electrically connected with at least one of the plurality of X-touch electrodes or the plurality of Y-touch electrodes and having a portion positioned in the active area, wherein the plurality of touch routing lines include a plurality of first touch routing lines electrically connected with two or more among the plurality of X-touch electrodes and a plurality of second touch routing lines electrically connected with one of the plurality of Y-touch electrodes, and wherein one of the plurality of first X-touch routing lines is electrically connected with at least another one of the plurality of first X-touch routing lines in the non-active area, and the plurality of second touch routing lines are electrically separated from each other.

Embodiments of the disclosure provide a substrate including an active area, the active area including a first sub area and a second sub area. There are a plurality of light emitting elements on the active area of the substrate and an encapsulation layer on the plurality of light emitting elements. A first plurality of touch electrodes are positioned on the encapsulation layer and in the first subarea, the first plurality of touch electrodes including a first X-touch electrode arranged along a first direction and a first Y-touch electrode arranged along a second direction different from the first direction. A second plurality of touch electrodes positioned on the encapsulation layer and in the second subarea, the second plurality of touch electrodes including a second X-touch electrode arranged along the first direction and a second Y-touch electrode arranged along the second direction. A first touch routing line that extends through an opening within the first X-touch electrode and an opening within the second X-touch electrode, the first touch routing line in connection with the first X-touch electrode and the second X-touch electrode.

According to one embodiment, a second touch routing line extends through an opening within the first Y-touch electrode and an opening within the second Y-touch electrode, the second touch routing line in connection with the first Y-touch electrode and is electrically separated from any Y-touch electrode positioned in the second sub area.

According to embodiments of the disclosure, it is possible to reduce a load by a touch sensor structure implemented in a large-area display panel and enhance touch sensing performance by the touch sensor structure.

BRIEF DESCRIPTION OF THE SEVERAL VIEWS OF THE DRAWINGS

The above and other technical elements, features, and advantages of the disclosure will be more clearly understood from the following detailed description, taken in conjunction with the accompanying drawings, in which:

FIG. 9 is a view illustrating another example of a touch sensor structure included in a touch display device according to embodiments of the disclosure.

DETAILED DESCRIPTION

Figure 1:
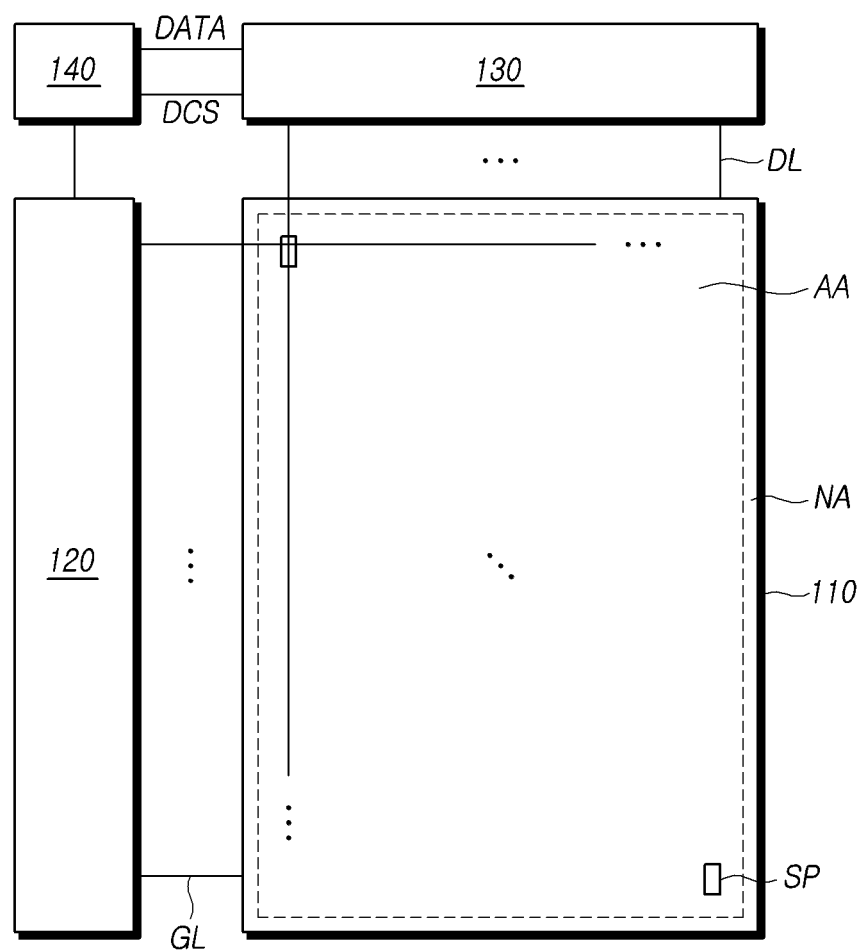
FIG. 1 is a view schematically illustrating a configuration of a touch display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to accompanying drawings.

Figure 2:
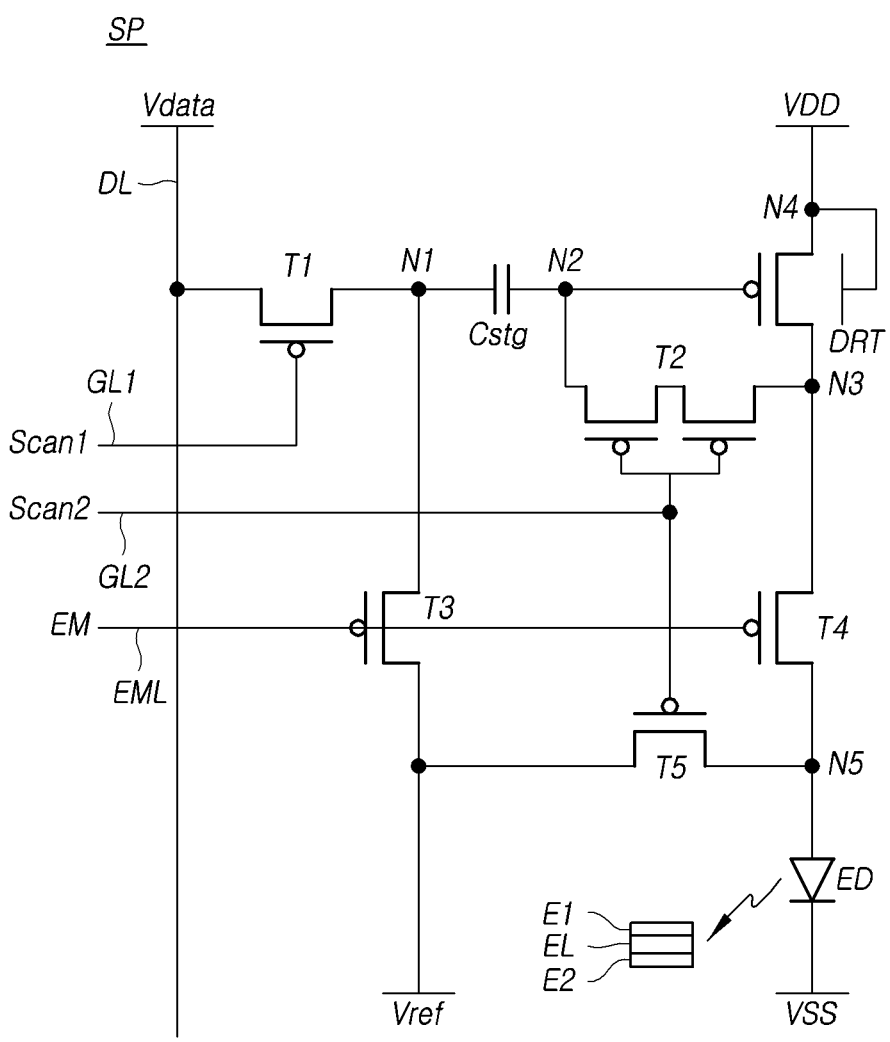
FIG. 2 is a view illustrating an example circuit structure of a subpixel included in a touch display device according to embodiments of the disclosure.

FIG. 1 is a view schematically illustrating a configuration of a touch display device 100 according to embodiments of the disclosure. FIG. 2 is a view illustrating an example circuit structure of a subpixel SP included in a touch display device 100 according to embodiments of the disclosure.

Referring to FIGS. 1 and 2, a touch display device 100 may include a display panel 110, a gate driving circuit 120 for driving the display panel 110, a data driving circuit 130, and a controller 140.

The touch display device 100 may further include a component for touch sensing in addition to a component for driving the display.

The display panel 110 may include an active area AA in which a plurality of subpixels SP are disposed and a non-active area NA positioned outside the active area AA. A plurality of gate lines GL and a plurality of data lines DL may be disposed on the display panel 110. A plurality of subpixels SP may be positioned in areas where the gate lines GL and the data lines DL intersect.

The gate driving circuit 120 may be controlled by the controller 140. The gate driving circuit 120 may sequentially output scan signals to the plurality of gate lines GL disposed on the display panel 110 to control the driving timing of the plurality of subpixels SP.

The gate driving circuit 120 may include one or more gate driver integrated circuits (GDICs). The gate driving circuit 120 may be positioned on only one side of the display panel 110 and may be positioned on each of two opposite sides depending on driving schemes.

Each gate driver integrated circuit (GDIC) may be connected to a bonding pad of the display panel 110 in a tape automated bonding (TAB) manner or a chip on glass (COG) manner. Alternatively or additionally, each gate driver integrated circuit (GDIC) may be implemented in a gate in panel (GIP) type and directly disposed on the display panel 110. Alternatively or additionally, each gate driver integrated circuit (GDIC) may be integrated and disposed on the display panel 110. Alternatively or additionally, each gate driver integrated circuit (GDIC) may be implemented in a chip on film (COF) manner to be mounted on a film connected to the display panel 110.

The data driving circuit 130 may receive image data DATA from the controller 140 and convert the image data DATA into an analog data voltage Vdata. The data driving circuit 130 may output the data voltage Vdata to each data line DL according to the timing of application of a scan signal through the gate line GL, so that each subpixel SP expresses a brightness according to the image data.

The data driving circuit 130 may include one or more source driver integrated circuits (SDICs). Each source driver integrated circuit (SDIC) may include a shift register, a latch circuit, a digital-to-analog converter, an output buffer, and the like.

Each source driver integrated circuit (SDIC) may be connected to a bonding pad of the display panel 110 in a tape automated bonding (TAB) manner or a chip on glass (COG) manner. Alternatively or additionally, each source driver integrated circuit (SDIC) may be directly disposed on the display panel 110. Alternatively or additionally, each source driver integrated circuit (SDIC) may be integrated and disposed on the display panel 110. Alternatively or additionally, each source driver integrated circuit (SDIC) may be implemented in a chip on film (COF) manner. In this case, each source driver integrated circuit (SDIC) may be mounted on a film connected to the display panel 110 and may be electrically connected to the display panel 110 through lines on the film.

The controller 140 may supply various control signals to the gate driving circuit 120 and the data driving circuit 130 and control driving of the gate driving circuit 120 and the data driving circuit 130.

The controller 140 may be mounted on a printed circuit board or a flexible printed circuit. The controller 140 may be electrically connected to the gate driving circuit 120 and the data driving circuit 130 through the printed circuit board or the flexible printed circuit.

The controller 140 may control the gate driving circuit 120 to output a scan signal according to a timing set in each frame. The controller 140 may convert the image data received from the outside (e.g., a host system) according to a data signal format used by the data driving circuit 130 and output the converted image data DATA to the data driving circuit 130.

The controller 140 may receive, from the outside (e.g., host system), various timing signals including a vertical synchronization signal VSYNC, a horizontal synchronization signal HSYNC, an input data enable signal DE, and a clock signal CLK, together with the image data.

The controller 140 may generate a diversity of control signals using the timing signals received from the outside and output the control signals to the gate driving circuit 120 and the data driving circuit 130.

As an example, to control the gate driving circuit 120, the controller 140 may output various gate control signals GCS including a gate start pulse GSP, a gate shift clock GSC, and a gate output enable signal GOE.

The gate start pulse GSP may control the operation start timing of one or more gate driver integrated circuits GDICs constituting the gate driving circuit 120. The gate shift clock GSC is a clock signal commonly input to one or more gate driver integrated circuits GDICs and may control the shift timing of the scan signals. The gate output enable signal GOE may designate timing information about one or more gate driver integrated circuits GDICs.

To control the data driving circuit 130, the controller 140 may output various data control signals DCS including, e.g., a source start pulse SSP, a source sampling clock SSC, and a source output enable signal SOE, to the data driving circuit 130.

The source start pulse SSP may control the data sampling start timing of one or more source driver integrated circuits SDICs constituting the data driving circuit 130. The source sampling clock SSC may be a clock signal for controlling the sampling timing of data in each of one or more source driver integrated circuits SDIC. The source output enable signal SOE may control the output timing of the data driving circuit 130.

The touch display device 100 may further include a power management integrated circuit that supplies various voltages or currents to, or controls various voltages or currents to, the display panel 110, the gate driving circuit 120, the data driving circuit 130, and the like.

Each subpixel SP may be an area defined by the intersection of the gate line GL and the data line DL, and may have a liquid crystal layer disposed thereon, or a light emitting element disposed thereon, depending on the type of touch display device 100.

For example, when the touch display device 100 is an organic light emitting display device, organic light emitting diodes (OLEDs) and various circuit elements may be disposed in the plurality of subpixels SP. Each subpixel SP may display a brightness corresponding to image data by controlling the current supplied to the OLED by several circuit elements.

Alternatively or additionally, in some cases, a light emitting diode (LED), a micro light emitting diode (μLED), or a quantum dot light emitting diode (QLED) may be disposed in the subpixel SP.

Referring to FIG. 2, each of the plurality of subpixels SP may include a light emitting element ED. The subpixel SP may include a driving transistor DRT that controls driving current supplied to the light emitting element ED.

The subpixel SP may include at least one circuit element in addition to the light emitting element ED and the driving transistor DRT to drive the subpixel SP.

For example, the subpixel SP may include a first transistor T1, a second transistor T2, a third transistor T3, a fourth transistor T4, a fifth transistor T5, and a storage capacitor Cstg.

The example shown in FIG. 2 illustrates a 6T1C structure in which 6 transistors and 1 capacitor are disposed, but embodiments of the disclosure are not limited thereto. Although the example shown in FIG. 2 illustrates a case where the transistors are P-type, at least some of the transistors disposed in the subpixel SP may be N-type.

Further, the transistor disposed in the subpixel SP may include, e.g., a semiconductor layer formed of low temperature polysilicon (LTPS) or a semiconductor layer formed of an oxide semiconductor. Further, in some cases, transistors including a semiconductor layer formed of low-temperature polycrystalline silicon and transistors including a semiconductor layer formed of an oxide semiconductor may be mixed and disposed in the subpixel SP.

The first transistor T1 may be electrically connected between the data line DL and the first node N1. The first transistor T1 may be controlled by the first scan signal Scan1 supplied through the first gate line GL1. The first transistor T1 may control application of the data voltage Vdata to the first node N1.

The second transistor T2 may be electrically connected between the second node N2 and the third node N3. The second node N2 may be the gate node of the driving transistor DRT. The third node N3 may be the drain node or source node of the driving transistor DRT. The second transistor T2 may be controlled by the second scan signal Scan2 supplied through the second gate line GL2. The second transistor T2 may perform an operation for compensating for a change in the threshold voltage of the driving transistor DRT.

The third transistor T3 may be electrically connected between the line to which the reference voltage Vref is supplied and the first node N1. The third transistor T3 may be controlled by the emission control signal EM supplied through the emission control line EML. The third transistor T3 may control discharge of the first node N1 or application of the reference voltage Vref to the first node N1.

The fourth transistor T4 may be electrically connected between the third node N3 and the fifth node N5. The fifth node N5 may be a node electrically connected to the light emitting element ED. The fourth transistor T4 may be controlled by the emission control signal EM supplied through the emission control line EML. The fourth transistor T4 may control the timing when driving current is supplied to the light emitting element ED.

The fifth transistor T5 may be electrically connected between a line to which the reference voltage Vref is supplied and the fifth node N5. The fifth transistor T5 may be controlled by the second scan signal Scan2 supplied through the second gate line GL2. The fifth transistor T5 may control discharge of the fifth node N5 or application of the reference voltage Vref to the fifth node N5.

The driving transistor DRT may be electrically connected between the fourth node N4 and the third node N3. The fourth node N4 may be electrically connected to a line to which the first driving voltage VDD is supplied. The first driving voltage VDD may be, e.g., a high-potential driving voltage. The fourth node N4 may be the source node or drain node of the driving transistor DRT.

The driving transistor DRT may be controlled by a voltage difference between the voltage of the second node N2 and the voltage of the fourth node N4. The driving transistor DRT may control the driving current supplied to the light emitting element ED.

The driving transistor DRT may include a back gate electrode electrically connected to the fourth node N4. The current output of the driving transistor DRT may be stably achieved by the back gate electrode electrically connected to the source node of the driving transistor DRT. For example, the back gate electrode may be disposed using a metal layer to block external light from entering the channel of the driving transistor DRT.

The light emitting element ED may be electrically connected between the fifth node N5 and the line to which the second driving voltage VSS is supplied. The second driving voltage VSS may be, e.g., a low-potential driving voltage.

The light emitting element ED may include a first electrode layer E1 electrically connected to the fifth node N5, a second electrode layer E2 to which the second driving voltage VSS is applied, and a light emitting layer EL disposed between the first electrode layer E1 and the second electrode layer E2.

The light emitting element ED may display a brightness according to the driving current supplied by the driving transistor DRT. The driving timing of the light emitting element ED may be controlled by the fourth transistor T4.

The driving timing of the subpixel SP shown in FIG. 2 is briefly described. A turn-on level second scan signal Scan2 may be supplied through the second gate line GL2. Since the transistor disposed in the subpixel SP is a P type, the turn-on level may be a low level.

The second transistor T2 and the fifth transistor T5 may be turned on by the turn-on level second scan signal Scan2.

Since the second transistor T2 is turned on, the second node N2 and the third node N3 may be electrically connected. A voltage obtained by reflecting the threshold voltage of the driving transistor DRT to the first driving voltage VDD may be applied to the second node N2 through the second transistor T2. Through this process, a change in the threshold voltage of the driving transistor DRT may be compensated for.

Since the fifth transistor T5 is turned on, the reference voltage Vref may be applied to the fifth node N5. The fifth node N5 may be initialized.

Thereafter, the turn-on level first scan signal Scan1 may be supplied through the first gate line GL1.

The first transistor T1 may be turned on by the turn-on level first scan signal Scan1.

Since the first transistor T1 is turned on, the data voltage Vdata may be applied to the first node N1.

The first driving voltage VDD, which reflects the data voltage Vdata and the threshold voltage of the driving transistor DRT may be applied to two opposite ends of the storage capacitor Cstg.

Thereafter, the turn-on level emission control signal EM may be supplied through the emission control line EML.

The third transistor T3 and the fourth transistor T4 may be turned on.

Since the third transistor T3 is turned on, the voltage of the first node N1 may be changed to the reference voltage Vref. The voltage of the second node N2 coupled to the first node N1 may be changed according to a change in voltage of the first node N1.

The voltage obtained by reflecting the threshold voltage of the driving transistor DRT and the data voltage Vdata to the first driving voltage VDD may be applied to the second node N2, and the first driving voltage VDD may be applied to the fourth node N4. The difference between the voltage of the second node N2 and the voltage of the fourth node N4 may be the voltage which reflects the data voltage Vdata and the threshold voltage of the driving transistor DRT. A driving current corresponding to the data voltage Vdata may be supplied by the driving transistor DRT.

Since the fourth transistor DRT is turned on, the driving current supplied by the driving transistor DRT may be supplied to the light emitting element ED.

The light emitting element ED may represent a brightness according to the driving current, and the subpixel SP including the light emitting element ED may display an image corresponding to image data.

Further, embodiments of the disclosure may implement a touch sensor structure on the display panel 110 that displays images, providing the function for sensing the user's touch on the display panel 110.

Figure 3:
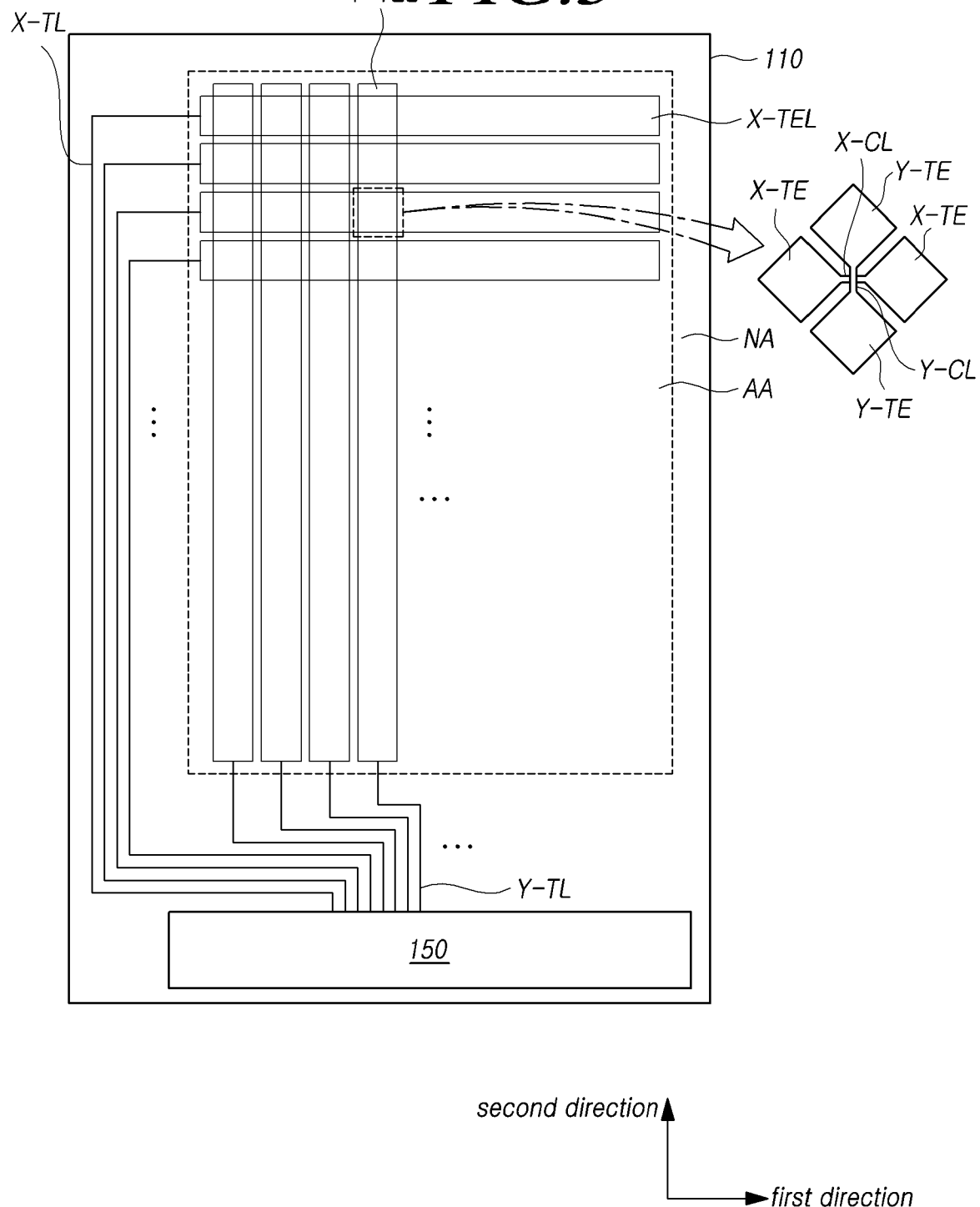
FIG. 3 is a view illustrating an example of a touch sensor structure included in a touch display device according to embodiments of the disclosure.

FIG. 3 is a view illustrating an example of a touch sensor structure included in a touch display device 100 according to embodiments of the disclosure.

Referring to FIG. 3, the touch display device 100 may include a plurality of touch electrode lines TEL and a plurality of touch routing lines TL disposed on the display panel 110. The touch display device 100 may include a touch driving circuit 150 that drives the plurality of touch electrode lines TEL and the plurality of touch routing lines TL.

Each of the plurality of touch electrode lines TEL may be electrically connected to the touch driving circuit 150 through a touch routing line TL. The touch driving circuit 150 may be disposed separately or, in some cases, it may be integrated with a circuit for display driving. For example, the touch driving circuit 150 may be integrated with the data driving circuit 130.

Each of the plurality of touch electrode lines TEL may include a plurality of touch electrodes TE electrically connected to each other along one direction. Further, each of the plurality of touch electrode lines TEL may include a plurality of touch electrode connection patterns CL electrically connecting the plurality of touch electrodes TE to each other.

For example, each of the plurality of X-touch electrode lines X-TEL may include a plurality of X-touch electrodes X-TE arranged along a first direction and a plurality of X-touch electrode connection patterns X-CL electrically connecting the plurality of X-touch electrodes X-TE.

For example, each of the plurality of Y-touch electrode lines Y-TEL may include a plurality of Y-touch electrodes Y-TE arranged along a second direction crossing the first direction and a plurality of Y-touch electrode connection patterns Y-CL electrically connecting the plurality of Y-touch electrodes Y-TE.

The X-touch electrode line X-TEL and the Y-touch electrode line Y-TEL may be disposed on different layers. Alternatively or additionally, the X-touch electrodes X-TE and Y-touch electrodes Y-TE may be disposed on the same layer. In this case, either the X-touch electrode connection pattern X-CL or the Y-touch electrode connection pattern Y-CL may be disposed on a different layer from the touch electrode TE.

For example, the touch electrode TE may have a rectangular shape, but is not limited thereto.

The touch electrode TE may be formed of a transparent conductive material and may be positioned without interfering with the image display capabilities of the display panel 110.

Alternatively or additionally, the touch electrode TE may be formed of an opaque metal. In this case, the touch electrode TE may have an open area corresponding to the emission area of the light emitting element ED disposed on the display panel 110. For example, the touch electrode TE may be implemented in a mesh shape and disposed to avoid the emission area.

In a structure in which a plurality of X-touch electrode lines X-TEL and a plurality of Y-touch electrode lines Y-TEL are disposed to cross each other, the touch driving circuit 150 may perform touch sensing while driving the touch electrode line TEL through the touch routing line TL.

For example, either the X-touch electrode line X-TEL or the Y-touch electrode line Y-TEL may be a touch driving electrode to which a touch driving signal is applied. The other of the X-touch electrode line X-TEL and the Y-touch electrode line Y-TEL may be a touch sensing electrode from which a touch sensing signal is detected.

The touch driving circuit 150 may detect a change in mutual capacitance that occurs when the user touches in a state in which different signals are applied to the X-touch electrode line X-TEL and the Y-touch electrode line Y-TEL.

The touch driving circuit 150 may transfer sensing data according to the detected change in mutual capacitance to the touch controller. The touch controller may detect whether a touch to the display panel 110 has occurred and touch coordinates based on the sensing data received from the touch driving circuit 150.

The touch electrode lines TEL disposed on the display panel 110 may be divided and disposed in multiple areas in the active area AA.

Since the touch electrode line TEL is divided and disposed for each area, the load of the touch electrode line TEL may be reduced. When the area of the display panel 110 increases, it is possible to reduce the load of the touch electrode line TEL while enhancing touch sensing performance.

Figure 4:
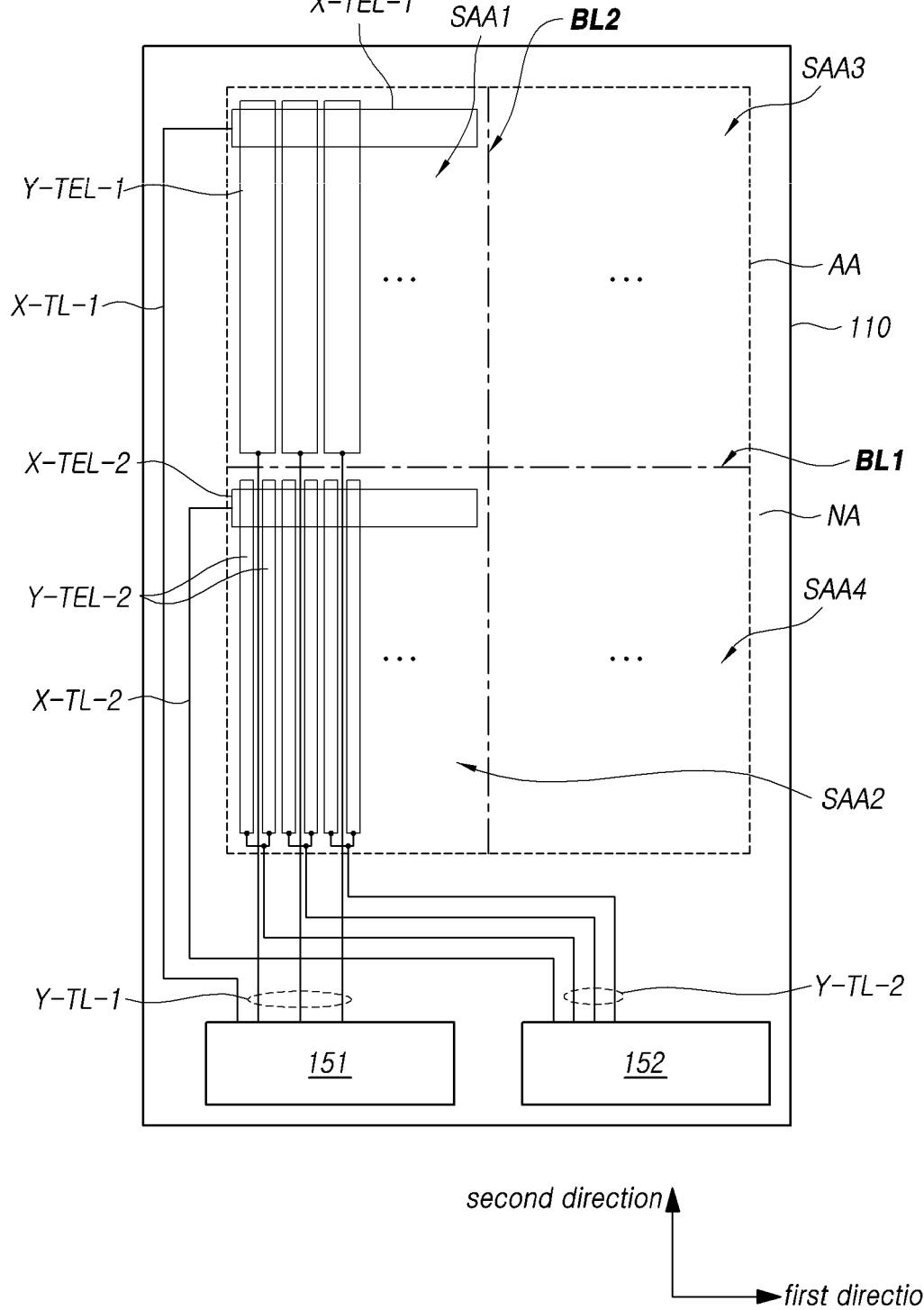
FIG. 4 is a view illustrating another example of a touch sensor structure included in a touch display device according to embodiments of the disclosure.

FIG. 4 is a view illustrating another example of a touch sensor structure included in a touch display device 100 according to embodiments of the disclosure.

Referring to FIG. 4, the active area AA of the display panel 110 may include a plurality of sub areas SAA divided by a boundary in a first direction and a boundary in a second direction.

The active area AA may include at least two or more sub areas SAA divided by a first boundary BL1 along the first direction. The active area AA may include at least two or more sub areas SAA divided by a second boundary BL2 along the second direction.

For example, the first sub area SAA1 and the second sub area SAA2 may be divided by the first boundary BL1. The third sub area SAA3 and the fourth sub area SAA4 may be divided by the first boundary BL1.

The first sub area SAA1 and the third sub area SAA3 may be divided by the second boundary BL2. The second sub area SAA2 and the fourth sub area SAA4 may be divided by the second boundary BL2.

FIG. 4 illustrates an example in which the active area AA is divided into four sub areas SAA, but the active area AA may be divided into a plurality of sub areas other than four sub areas by the first boundary BL1 and the second boundary BL2.

The touch electrode lines TEL disposed in each of the plurality of sub areas SAA may be disposed separately from the touch electrode lines TEL disposed in the other sub areas SAA.

The touch electrode lines TEL disposed in each of the plurality of sub areas SAA may be independently driven.

For example, the first X-touch electrode line X-TEL-1 disposed in the first sub area SAA1 may be electrically connected to the first touch driving circuit 151 through the first X-touch routing line X-TL-1. The first Y-touch electrode line Y-TEL-1 may be electrically connected to the first touch driving circuit 151 through the first Y-touch routing line Y-TL-1.

The second X-touch electrode line X-TEL-2 disposed in the second sub area SAA2 may be electrically connected to the second touch driving circuit 152 through the second X-touch routing line X-TL-2. The second Y-touch electrode line Y-TEL-2 may be electrically connected to the second touch driving circuit 152 through the second Y-touch routing line Y-TL-2.

The first X-touch electrode line X-TEL-1 and the first Y-touch electrode line Y-TEL-1 may be driven by the first touch driving circuit 151. The second X-touch electrode line X-TEL-2 and the second Y-touch electrode line Y-TEL-2 may be driven by the second touch driving circuit 152. The touch electrode lines TEL in the third and fourth sub areas SAA3 and SAA4 may be disposed in a similar structure, and driven in a similar manner, to that of the touch electrode lines TEL disposed in the first and second sub areas SAA1 and SAA2.

Since the touch electrode line TEL disposed in the first sub area SAA1 and the touch electrode line TEL disposed in the second sub area SAA2 are electrically separated from each other and driven by different touch driving circuits 150, the load for touch sensing may be reduced and performance of touch sensing may be enhanced.

Further, in some cases, the touch electrode lines TEL disposed in two or more sub areas SAA may be driven by the same touch driving circuit 150. For example, the touch electrode line TEL disposed in the first sub area SAA1 and the touch electrode line TEL disposed in the second sub area SAA2 may be driven by the same touch driving circuit 150. The touch electrode line TEL disposed in the third sub area SAA3 and the touch electrode line TEL disposed in the fourth sub area SAA4 may be driven by the same touch driving circuit 150. Alternatively or additionally, as another example, the touch electrode lines TEL disposed in the first sub area SAA1, the second sub area SAA2, the third sub area SAA3, and the fourth sub area SAA4 may be driven by the same touch driving circuit 150. Even in this case, since the touch electrode lines TEL disposed in the sub areas SAA are disposed in a structure in which they are separated from each other, the load of the touch electrode lines TEL may be reduced, and touch sensing performance may be enhanced.

As described above, in a structure in which the touch electrode lines TEL are divided and disposed in the plurality of sub areas SAA, some of the touch routing lines TL may be disposed in the active area AA.

For example, the first X-touch routing line X-TL-1 electrically connected to the first X-touch electrode line X-TEL-1 of the first sub area SAA1 and the second X-touch routing line X-TL-2 electrically connected to the second X-touch electrode line X-TEL-2 of the second sub area SAA2 may be disposed in the non-active area NA.

The second Y-touch routing line Y-TL-2 electrically connected to the second Y-touch electrode line Y-TEL-2 of the second sub area SAA2 may be disposed in the non-active area NA.

A portion of the first Y-touch routing line Y-TL-1 electrically connected to the first Y-touch electrode line Y-TEL-1 of the first sub area SAA1 may be disposed in the active area AA.

A portion of the first Y-touch routing line Y-TL-1 may be disposed in the second sub area SAA2. The first Y-touch routing line Y-TL-1 may pass through the second sub area SAA2 and be electrically connected to the first Y-touch electrode line Y-TEL-1 disposed in the first sub area SAA1.

Since a portion of the first Y-touch routing line Y-TL-1 is disposed in the second sub area SAA2, at least one of the second X-touch electrode line X-TEL-2 and the second Y-touch electrode line Y-TEL-2 disposed in the second sub area SAA2 may be disposed separately in the area where the first Y-touch routing line Y-TL-1 is disposed. FIG. 4 illustrates an example in which the second Y-touch electrode lines Y-TEL-2 are divided and disposed in the second sub area SAA2 due to the placement of the first Y-touch routing line Y-TL-1.

As such, when the touch electrode lines TEL are divided and disposed in each sub area SAA, the number of touch routing lines TL connected to the touch electrode lines TEL may increase. Since the number of touch routing lines TL increases, the non-active area NA may increase due to the placement of the touch routing lines TL. However, the first Y-touch routing line Y-TL-1 is electrically connected to the first Y-touch electrode line Y-TEL-1 of the first sub area SAA1 through the active area AA. Therefore, addition of a separate area for the placement of the first Y-touch routing line Y-TL-1 in the non-active area NA may not be required. A touch sensor structure divided into sub areas SAA may be implemented without increasing the non-active area NA due to the addition of the first Y-touch routing line Y-TL-1.

The touch sensor structure divided into a plurality of sub areas SAA may be divided into an upper touch sensor portion and a lower touch sensor portion with respect to the first boundary BL1. Further, the touch sensor structure may be divided into a left touch sensor portion and a right touch sensor portion with respect to the second boundary BL2. Here, the lower touch sensor portion may be positioned closer to the pad to which the touch routing line TL is connected, than the upper touch sensor portion is. In other words, the distance between the lower touch sensor portion and the area where the pad connected to the touch routing line TL is disposed may be smaller than the distance between the upper touch sensor portion and the area where the pad is disposed.

As such, since the touch electrode lines TEL are divided into a plurality of sub areas SAA and driven, the load of the touch electrode lines TEL may be reduced, and touch sensing performance may be enhanced.

Further, as in the example shown in FIG. 4, since some of the plurality of Y-touch routing lines Y-TL are disposed in the active area AA, even when the number of touch routing lines TL increases, the non-active area NA may not increase.

Further, the non-active area NA may be further reduced by a structure in which at least some of the plurality of X-touch routing lines X-TL are disposed in the active area AA.

Figure 5:
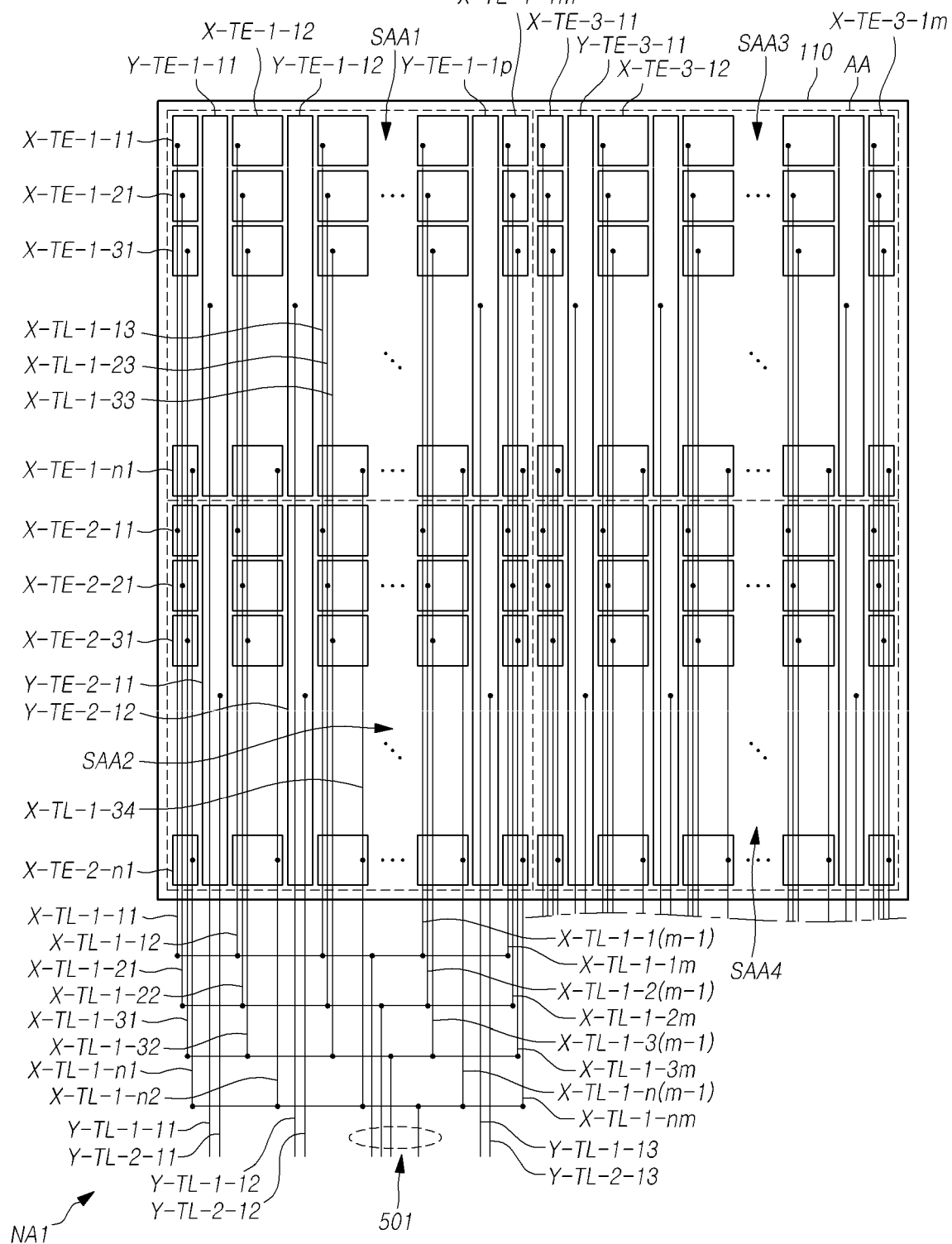
FIG. 5 is a view illustrating another example of a touch sensor structure included in a touch display device according to embodiments of the disclosure.

FIG. 5 is a view illustrating another example of a touch sensor structure included in a touch display device 100 according to embodiments of the disclosure.

Referring to FIG. 5, an active area AA may include a first sub area SAA1, a second sub area SAA2, a third sub area SAA3, and a fourth sub area SAA4. FIG. 5 illustrates an example in which the active area AA is divided into four sub areas SAAs, but the number of sub areas SAAs may vary.

A plurality of first X-touch electrodes X-TE-1 and a plurality of first Y-touch electrodes Y-TE-1 may be disposed in the first sub area SAA1. A plurality of second X-touch electrodes X-TE-2 and a plurality of second Y-touch electrodes Y-TE-2 may be disposed in the second sub area SAA2. Similar to the structure in which the touch electrodes TE are disposed in the first sub area SAA1 and the second sub area SAA2, the touch electrodes TE are disposed in the third sub area SAA3 and SAA4.

A plurality of first X-touch electrodes X-TE-1 disposed in the first sub area SAA1 may be disposed along a plurality of rows and a plurality of columns. For example, the plurality of first X-touch electrodes X-TE-1-11, . . . , X-TE-1-1$m$ may be disposed in the first row of the first sub area SAA1. For example, the plurality of first X-touch electrodes X-TE-1-11, . . . , X-TE-1-$n$1 may be disposed in the first column of the first sub area SAA1.

Each of the plurality of first X-touch electrodes X-TE-1 may have, e.g., a rectangular shape, but is not limited thereto.

Some of the plurality of first X-touch electrodes X-TE-1 may have a shape or area different from that of the remaining first X-touch electrodes X-TE-1. For example, the first X-touch electrodes X-TE-1-11, X-TE-1-21, X-TE-1-31, . . . , X-TE-1-$n$1 adjacent to the left boundary of the first sub area SAA1 may be different in shape or area from at least some of the remaining first X-touch electrodes X-TE-1. For example, the area of the first X-touch electrodes X-TE-1-11, X-TE-1-21, X-TE-1-31, . . . , X-TE-1-$n$1 adjacent to the left boundary of the first sub area SAA1 may be smaller than the area of at least some of the remaining first X-touch electrodes X-TE-1. A sensor unit composed of the X-touch electrode X-TE and the Y-touch electrode Y-TE may be configured in a constant manner by adjusting the size of the X-touch electrode X-TE depending on the position.

The plurality of first Y-touch electrodes Y-TE-1 disposed in the first sub area SAA2 may be disposed between rows of the first X-touch electrodes X-TE-1. The plurality of first Y-touch electrodes Y-TE-1 may be disposed along one row and a plurality of columns. For example, the plurality of first Y-touch electrodes Y-TE-1-11, . . . , Y-TE-1-1$p$ may be disposed along a row direction.

Each of the plurality of first Y-touch electrodes Y-TE-1 may have, e.g., a bar-shaped rectangle, but is not limited thereto.

The plurality of second X-touch electrodes X-TE-2 disposed in the second sub area SAA2 may be disposed in the same or similar structure to the structure in which the plurality of first X-touch electrodes X-TE-1 in the first sub area SAA1 are disposed.

The plurality of second Y-touch electrodes Y-TE-2 disposed in the second sub area SAA2 may be disposed in the same or similar structure to the structure in which the plurality of first Y-touch electrodes Y-TE-1 in the first sub area SAA1 are disposed.

Some of the X-touch routing lines X-TL electrically connected to the X-touch electrodes X-TE disposed in the first sub area SAA1 and the second sub area SAA2 may be disposed in the active area AA. Some of the Y-touch routing lines Y-TL electrically connected to the Y-touch electrodes Y-TE disposed in the first sub area SAA1 and the second sub area SAA2 may be in the active area AA.

The X-touch routing line X-TL and the Y-touch routing line Y-TL may be disposed in the active area AA, electrically connecting the touch electrode TE and the touch driving circuit 150 to each other. Even if a plurality of touch routing lines TL are disposed on the display panel 110, the non-active area NA may be reduced.

In some implementations, at least one of the X-touch routing line X-TL and the Y-touch routing line Y-TL may be disposed on a layer different from the layer where the touch electrode TE is disposed. In some implementations, at least one of the X-touch routing line X-TL and the Y-touch routing line Y-TL may be disposed on the same layer as the layer on which the touch electrode TE is disposed.

At least one of the plurality of first X-touch electrodes X-TE-1 disposed in the first sub area SAA1 may be electrically connected with at least one of the plurality of second X-touch electrodes X-TE-2 disposed in the second sub area SAA2.

For example, the first X-touch electrode X-TE-1-11 disposed in the first sub area SAA1 may be electrically connected with the second X-touch electrode X-TE-2-11 disposed in the second sub area SAA2. The first X-touch electrode X-TE-1-11 and the second X-touch electrode X-TE-2-11 may be electrically connected by the first X-touch routing line X-TL-1-11. A portion of the first X-touch routing line X-TL-1-11 may be disposed in the first sub area SAA1. Another portion of the first X-touch routing line X-TL-1-11 may be disposed in the second sub area SAA2. The first X-touch routing line X-TL-1-11 disposed in the first sub area SAA1 and the second sub area SAA2 may be electrically connected to the first X-touch electrode X-TE-1-11 and the second X-touch electrode X-TE-2-11 and be electrically connected to the touch driving circuit 150.

FIG. 5 illustrates an example in which the first X-touch electrode X-TE-1 and the second X-touch electrode X-TE-2 disposed in the same row and same column in the first sub area SAA1 and the second sub area SAA2 are electrically connected to each other, but embodiments of the disclosure are not limited thereto. In some cases, the first X-touch electrode X-TE-1 and the second X-touch electrode X-TE-2 disposed in the same row and different columns may be electrically connected to each other. In some cases, the first X-touch electrode X-TE-1 and the second X-touch electrode X-TE-2 disposed in the same column and different rows may be electrically connected to each other.

In some implementations, at least one of the plurality of first X-touch routing lines X-TL-1 may be electrically connected to at least one of the plurality of first X-touch routing lines X-TL-1 in the non-active area NA.

As an example, a plurality of first X-touch routing lines X-TL-1-11, X-TL-1-12, . . . , X-TE-1-1m electrically connected to a plurality of first X-touch electrodes X-TE-1-11, X-TL-1-12, . . . , X-TL-1-1m, respectively, disposed in the first row of the first sub area SAA1 may be electrically connected in the non-active area NA1.

Two or more first X-touch electrodes X-TE-1 disposed in each row of the first sub area SAA1 may be electrically connected to each other. Two or more first X-touch electrodes X-TE-1 electrically connected to each other may be electrically connected to the touch driving circuit 150 through one line, as indicated by 501. Two or more X-touch electrodes TE disposed in the same row in each sub area SAA may constitute one electrode line.

Further, the first X-touch electrode X-TE-1 of the first sub area SAA1 and the second X-touch electrode X-TE-2 of the second sub area SAA2 are electrically connected to each other, so that two or more first X-touch electrodes X-TE-1 disposed in one row of the first sub area SAA1 and two or more second X-touch electrodes X-TE-2 disposed in one row of the second sub area SAA2 may be electrically connected to each other.

Two or more first X-touch electrodes X-TE-1 disposed in one row of the first sub area SAA1 and two or more second X-touch electrodes X-TE-1 disposed in one row of the second sub area SAA2 may be electrically connected with the touch driving circuit 150 through the same line, and, for example, coupled to a same channel of a driving transistor DRT.

Since the row of the first X-touch electrode X-TE-1 of the first sub area SAA1 and the row of the second X-touch electrode X-TE-2 of the second sub area SAA2 use the same channel, the number of channels included in the touch driving circuit 150 may be reduced.

In a structure in which the touch electrodes TE are divided and disposed in a plurality of sub areas SAA, an increase in the number of channels may be reduced.

In the above-described example, the X-touch electrode X-TE may be a touch driving electrode, but is not limited thereto.

The Y-touch electrodes Y-TE disposed in each sub area SAA may be electrically separated and disposed.

For example, the first Y-touch electrode Y-TE-1 disposed in the first sub area SAA1 may be disposed to be electrically separated from the second Y-touch electrode Y-TE-2 disposed in the second sub area SAA2.

For example, the first Y-touch electrode Y-TE-1 may be electrically connected to the first Y-touch routing line Y-TL-1. The second Y-touch electrode Y-TE-2 may be electrically connected to the second Y-touch routing line Y-TL-2.

The first Y-touch routing line Y-TL-1 and the second Y-touch routing line Y-TL-2 may be electrically separated from one another and disposed in the active area AA and the non-active area NA.

The first Y-touch electrode Y-TE-1 disposed in the first sub area SAA1 may be driven separately of the second Y-touch electrode Y-TE-2 disposed in the second sub area SAA2.

Since the first Y-touch electrode Y-TE-1 and the second Y-touch electrode Y-TE-2 are driven separately, a touch occurring in each of the first sub area SAA1 and the second sub area SAA2 may be detected even if the second X-touch electrode X-TE-2 of the second sub area SAA2 electrically connected with the first X-touch electrode X-TE-1 of the first sub area SAA1 is simultaneously driven.

In the above-described example, the Y-touch electrode Y-TE may be a touch driving electrode, but is not limited thereto.

As such, since a portion of the touch routing line TL connected to the touch electrode TE is disposed in the active area AA, an increase in the non-active area NA due to an increase in the number of touch routing lines TL in the structure in which touch electrodes TE are divided and disposed in a plurality of sub areas SAA may reduce.

Further, since some touch electrodes TE disposed in different sub areas SAA are electrically connected to each other to drive one channel, a touch sensor structure may be implemented while reducing the number of channels.

There may be provided a touch sensor structure in which the non-active area NA, the number of channels, and an increase in the load of the touch sensor structure are reduced.

Further, it is possible to enhance load uniformity and reduce the load of the touch sensor structure by a layout structure of touch routing lines TL or connection structure between touch electrodes TE in the active area AA.

Figure 6:
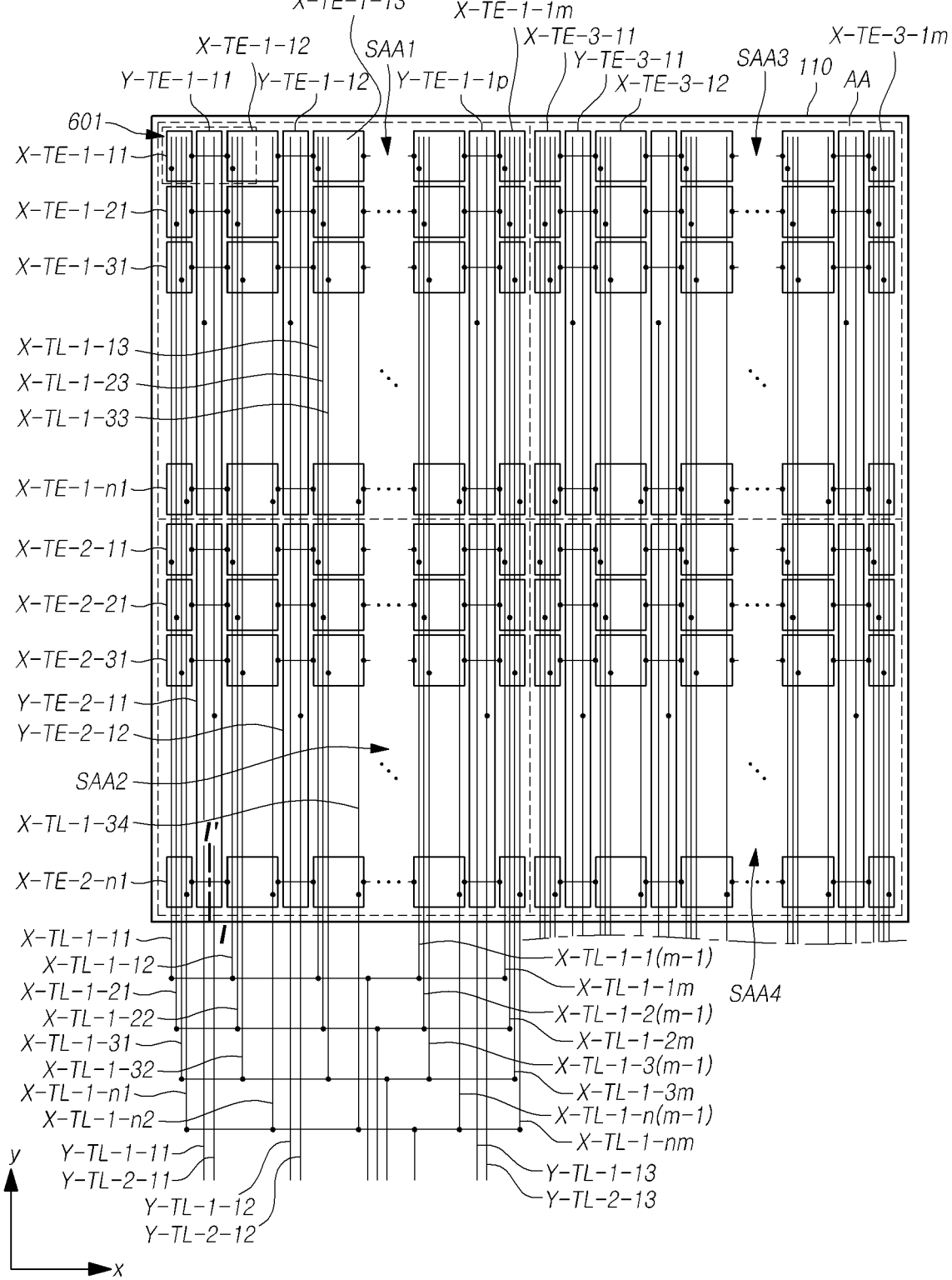
FIG. 6 is a view illustrating another example of a touch sensor structure included in a touch display device according to embodiments of the disclosure.
Figure 7:
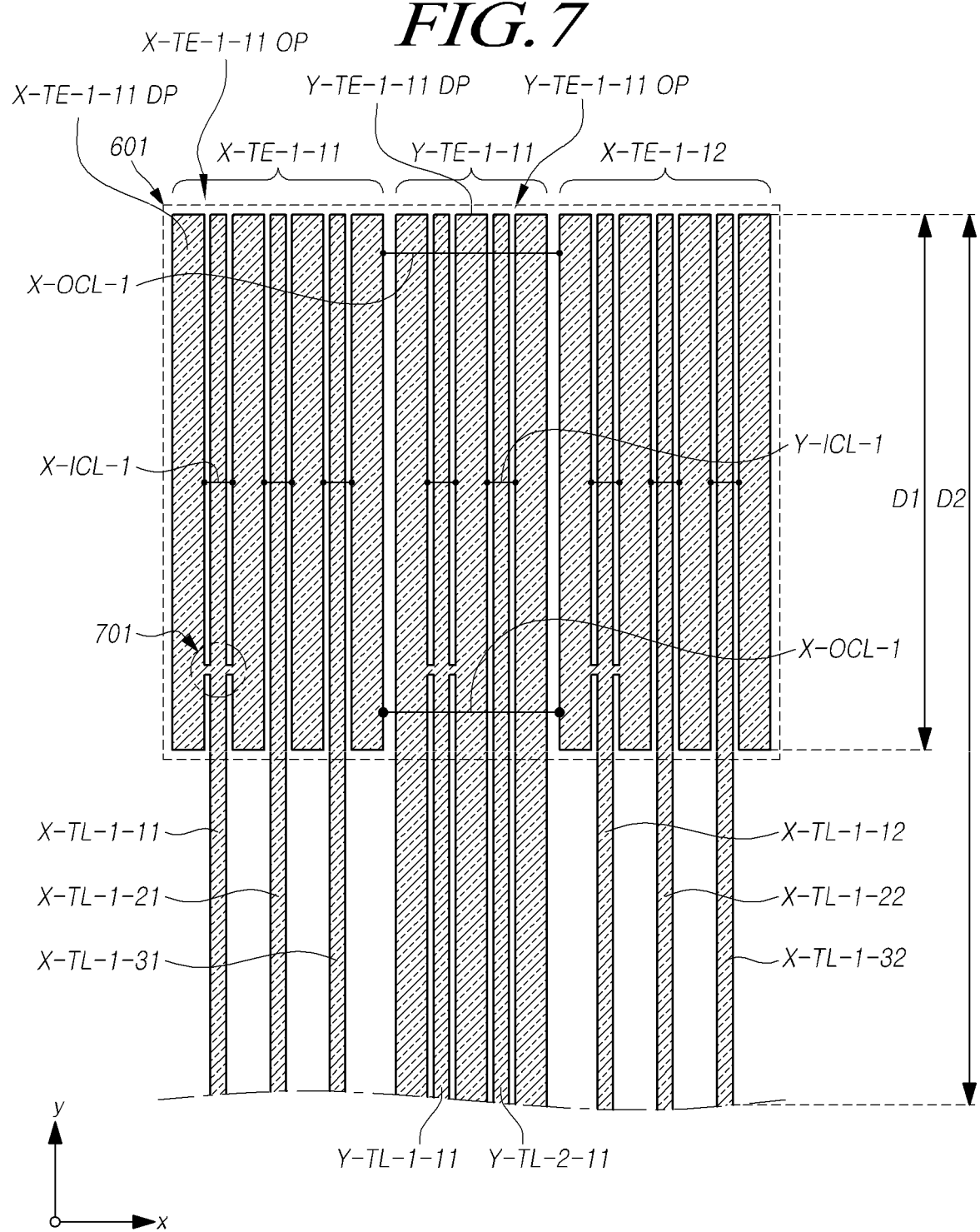
FIG. 7 is an example enlarged view of the portion indicated by 601 in FIG. 6.
Figure 8:
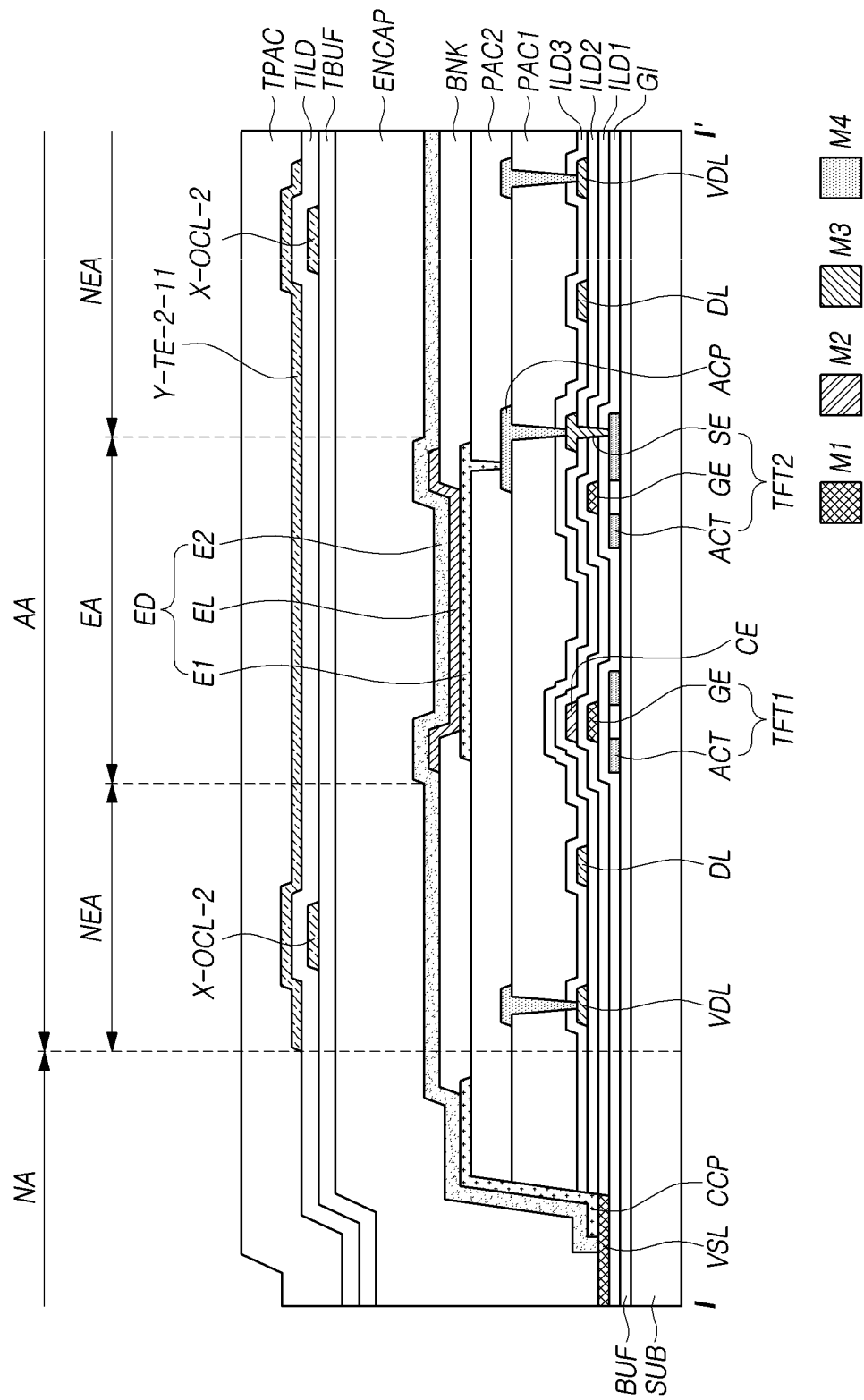
FIG. 8 is a cross-sectional view illustrating an example structure, taken along line I-I' of FIG. 6.

FIG. 6 is a view illustrating another example of a touch sensor structure included in a touch display device 100 according to embodiments of the disclosure. FIG. 7 is an example enlarged view of the portion indicated by 601 in FIG. 6. FIG. 8 is a cross-sectional view illustrating an example structure, taken along line I-I' of FIG. 6.

Referring to FIG. 6, the active area AA may include a plurality of sub areas SAA1, SAA2, SAA3, and SAA4. The touch electrodes TE may be divided and disposed in the plurality of sub areas SAA1, SAA2, SAA3, and SAA4.

Some of the first X-touch electrodes X-TE-1 disposed in the first sub area SAA1 may be electrically connected with some of the second X-touch electrodes X-TE-2 disposed in the second sub area SAA2. The first Y-touch electrodes Y-TE-1 disposed in the first sub area SAA1 may be disposed to be electrically separated from the second Y-touch electrodes Y-TE-2 disposed in the second sub area SAA2.

The first X-touch electrode X-TE-1 and the second X-touch electrode X-TE-2 may be electrically connected by the first X-touch routing line X-TL-1. A portion of the first X-touch routing line X-TL-1 may be disposed in the active area AA.

The first Y-touch electrode Y-TE-1 may be electrically connected to the first Y-touch routing line Y-TL-1. The second Y-touch electrode Y-TE-2 may be electrically connected to the second Y-touch routing line Y-TL-2. A portion of each of the first Y-touch routing line Y-TL-1 and the second Y-touch routing line Y-TL-2 may be disposed in the active area AA.

The lengths of the respective portions of the plurality of first X-touch routing lines X-TL-1, disposed in the active area AA, may be the same or similar. The lengths of the respective portions, disposed in the active area AA, of the plurality of first Y-touch routing lines Y-TL-1 and the respective portions, disposed in the active area AA, of the plurality of second Y-touch routing lines Y-TL-2 may be the same or similar.

For example, the length of the portion, disposed in the active area AA, of the first X-touch routing line X-TL-1-11 electrically connected with the first X-touch electrode X-TE-1-11 disposed in the first row and first column of the first sub area SAA1 may be the same or similar to the length of the portion, disposed in the active area AA, of the first X-touch routing line X-TL-1-21 electrically connected with the first X-touch electrode X-TE-1-21 disposed in the second row and first column of the first sub area SAA1.

The first X-touch routing line X-TL-1-21 may extend through the point connected to the first X-touch electrode X-TE-1-21 to the upper side of the active area AA. The load of the first X-touch routing line X-TL-1-21 may be reduced due to an increase in the length of the first X-touch routing line X-TL-1-21.

Since the portion, disposed in the active area AA, of each of the plurality of first X-touch routing lines X-TL-1 has the same or similar length, the load deviation between the plurality of first X-touch routing lines X-TL-1 may be reduced.

The first Y-touch routing line Y-TL-1 and the second Y-touch routing line Y-TL-2 may be disposed to extend to an upper side of the active area AA. The load of the Y-touch routing line Y-TL may be reduced.

Since the length of the portion, disposed in the active area AA, of the first Y-touch routing line Y-TL-1 is the same or similar to the length of the portion, disposed in the active area AA, of the second Y-touch routing line Y-TL-2, the load deviation between the Y-touch routing lines Y-TL may be reduced.

In some implementations, the plurality of first X-touch electrodes and the plurality of first Y-touch electrode in the first sub area SAA1 may be disposed alternately along the first direction, e.g., the x-axis direction in FIG. 6. For example, first X-touch electrode X-TE-1-12 is positioned between first Y-touch electrodes Y-TE-1-11 and Y-TE-1-12, and first Y-touch electrode Y-TE-1-11 is positioned between first X-touch electrodes X-TE-1-11 and X-TE-1-121.

The X-touch routing line X-TL and the Y-touch routing line Y-TL may be disposed on the layer where the X-touch electrode X-TE and the Y-touch electrode Y-TE are disposed. In this case, a portion of the first X-touch routing line X-TL-1 may be positioned inside the first X-touch electrode X-TE-1 in the first sub area SAA1, e.g., in an opening X-TE-1-11 OP (FIG. 7) within the X-touch electrode X-TE-1. Another portion of the first X-touch routing line X-TL-1 may be positioned inside the second X-touch electrode X-TE-2 in the second sub area SAA2, e.g., in an opening in the second X-touch electrode X-TE-2.

A portion of the first Y-touch routing line Y-TL-1 may be positioned inside the first Y-touch electrode Y-TE-1 in the first sub area SAA1, e.g., in an opening Y-TE-1-11 OP (FIG. 7) within the Y-touch electrode, Y-TE-1. Another portion of the first Y-touch routing line Y-TL-1 may be positioned inside the second Y-touch electrode Y-TE-2 in the second sub area SAA2, e.g., in an opening in the second Y-touch electrode Y-TE-2 in the second sub area SAA2.

A portion of the second Y-touch routing line Y-TL-2 may be positioned inside the first Y-touch electrode Y-TE-1 in the first sub area SAA1. Another portion of the second Y-touch routing line Y-TL-2 may be positioned inside the second Y-touch electrode Y-TE-2 in the second sub area SAA2.

X-touch electrodes X-TE may be disposed to be divided by the X-touch routing line X-TL. Y-touch electrodes Y-TE may be disposed to be divided by the Y-touch routing line Y-TL.

The divided X-touch electrodes X-TE or the divided Y-touch electrodes Y-TE may be electrically connected by the touch electrode connection pattern CL. The touch electrode connection pattern CL may be disposed on a layer different from the layer where the touch electrode TE is disposed.

FIG. 7 is an example enlarged view of the portion indicated by 601 in FIG. 6. For example, the portion indicated by 601 may be one sensor unit.

For example, the first X-touch electrode X-TE-1-11 may be divided by a plurality of first X-touch routing lines X-TL-1-11, X-TL-1-21, and X-TL-1-31. The first X-touch electrode X-TE-1-12 may be divided by a plurality of first X-touch routing lines X-TL-1-12, X-TL-1-22, and X-TL-1-32. For example, at least some of the plurality of first X-touch routing lines X-TL-1-11, X-TL-1-21, and X-TL-1-31 are positioned inside the first X-touch electrode X-TE-1-11. For example, the first X-touch electrode X-TE-1-11 may include one or more openings X-TE-1-11 OP each between two adjacent divided portions/parts X-TE-1-11 DP of first X-touch electrode X-TE-1-11. The plurality of first X-touch routing lines X-TL-1-11, X-TL-1-21, and X-TL-1-31 may each be positioned within one of the openings X-TE-1-11 OP. In some implementations, there may be multiple first X-touch routing lines within a same opening X-TE-1-11 OP. In some implementations, the plurality of first X-touch routing lines X-TL-1-11, X-TL-1-21, and X-TL-1-31 may each also be positioned within one of the openings (not shown in FIG. 7) in a second X-touch electrode, e.g., X-TE-2-11 (FIG. 6) disposed in the second sub area SAA2.

In some implementations, the opening X-TE-1-11 OP extends through an entire dimension D1 of the first X-touch electrode X-TE-1-11 in the second direction, e.g., the y-axis direction in FIG. 7.

The first X-touch electrode X-TE-1-11 may be electrically connected with one first X-touch routing line X-TL-1-11 among a plurality of first X-touch routing lines X-TL-1-11, X-TL-1-21, and X-TL-1-31 as indicated by 701, for example. The first X-touch electrode X-TE-1-11 may be insulated from the remaining first X-touch routing lines X-TL-1-21 and X-TL-1-31.

The divided portions of the first X-touch electrodes X-TE-1-11 may be electrically connected by at least one first X-touch electrode internal connection pattern X-ICL-1. The first X-touch electrode internal connection pattern X-ICL-1 may be disposed on a layer different from the layer where the first X-touch electrode X-TE-1-11 is disposed. Two or more first X-touch electrode internal connection patterns X-ICL-1 may electrically connect the divided portions of adjacent first X-touch electrode X-TE-1-11 to each other.

The first X-touch electrodes X-TE-1-11 and X-TE-1-12 positioned on two opposite sides of the first Y-touch electrode Y-TE-1-11 may be electrically connected by the first X-touch electrode external connection pattern X-OCL-1.

The first X-touch electrode external connection pattern X-OCL-1 may be disposed on a layer different from the layer where the first X-touch electrodes X-TE-1-11 and X-TE-1-12 are disposed. The first X-touch electrode external connection pattern X-OCL-1 may be disposed on the same layer as the layer where the first X-touch electrode internal connection pattern X-ICL-1 is disposed.

FIG. 7 illustrates an example in which two first X-touch electrode external connection patterns X-OCL-1 are connected to the first X-touch electrodes X-TE-1-11 and X-TE-1-12. The number of first X-touch electrode connection patterns X-OCL-1 and the points at which the first X-touch electrode connection patterns X-OCL-1 are connected may vary.

The first Y-touch electrode Y-TE-1-11 may be divided by a plurality of Y-touch routing lines Y-TL-1-11 and Y-TL-2-11. For example, at least some of the plurality of first Y-touch routing lines Y-TL-1-112 and Y-TL-1-11 are positioned inside the first Y-touch electrode Y-TE-1-11. For example, the first Y-touch electrode Y-TE-1-11 may include one or more openings Y-TE-1-11 OP each between two adjacent divided portions/parts Y-TE-1-11 DP of first Y-touch electrode Y-TE-1-11. The plurality of first Y-touch routing lines Y-TL-1-11 and Y-TL-2-11 may each be positioned within one of the openings Y-TE-1-11 OP. In some implementations, there may be multiple first Y-touch routing lines within a same opening Y-TE-1-11 OP. In some implementations, the plurality of first Y-touch routing lines Y-TL-1-112 and Y-TL-1-11 may each also be positioned within one of the openings (not shown in FIG. 7) in a second Y-touch electrode, e.g., Y-TE-2-11 (FIG. 6), disposed in the second sub area SAA2.

In some implementations, the opening Y-TE-1-11 OP extends through an entire dimension D2 of the first Y-touch electrode Y-TE-1-11 in the second direction.

In some implementations, the dimension D2 of the first Y-touch electrode Y-TE-1-11 in the second direction is greater than the dimension D1 of the first X-touch electrode X-TE-1-11 in the second direction.

The first Y-touch electrode Y-TE-1-11 may be electrically connected to the first Y-touch routing line Y-TL-1-11. The first Y-touch electrode Y-TE-1-11 may be electrically separated or insulated from the second Y-touch routing line Y-TL-2-11.

The portion of the first Y-touch electrode Y-TE-1-11, divided by the Y-touch routing lines Y-TL-1-11 and Y-TL-2-11, may be electrically connected by at least one first Y-touch electrode internal connection pattern Y-ICL-1.

The first Y-touch electrode internal connection pattern Y-ICL-1 may be disposed on a layer different from the layer where the first Y-touch electrode Y-TE-1-11, the first Y-touch routing line Y-TL-1-11, and the second Y-touch routing line Y-TL-2-11 are disposed.

The first Y-touch electrode internal connection pattern Y-ICL-1 may be positioned on the same layer as the layer where at least one of the first X-touch electrode internal connection pattern X-ICL-1 or the first X-touch electrode external connection pattern X-OCL-1 is disposed.

The number of first Y-touch electrode internal connection patterns Y-ICL-1 connecting the divided first Y-touch electrode Y-TE-1-11 and the point where the first Y-touch electrode internal connection pattern Y-ICL-1 is connected may vary.

As in the example shown in FIG. 7, no touch routing line TL may be disposed between the first X-touch electrodes X-TE-1-11 and X-TE-1-12 and the first Y-touch electrodes Y-TE-1-11. Or, in some cases, the X-touch routing line X-TL or Y-touch routing line Y-TL may be disposed between the first X-touch electrodes X-TE-1-11 and X-TE-1-12 and the first Y-touch electrode Y-TE-1-11.

The touch electrode TE and the touch routing line TL may be positioned while avoiding the area from which light is emitted to the outside in the subpixel SP. The shapes of the electrodes constituting the touch electrode TE and the shapes of the electrodes constituting the touch routing line TL may be the same or different.

For example, the electrodes constituting the touch electrode TE may be disposed as wide as possible in an area other than the area where light is emitted in the subpixel SP. In a structure in which the shape of the area from which light is emitted in the subpixel SP varies, the touch electrodes TE may be disposed as wide as possible, increasing touch sensing sensitivity.

The electrodes constituting the touch routing line TL may be disposed in an area other than the area where light is emitted in the subpixel SP and may be disposed in a predetermined shape. The electrodes constituting the touch routing line TL may be disposed in a predetermined pattern, and load deviation between the touch routing lines TL may be reduced.

As such, the touch sensor structure may reduce the overall load and load deviation by a structure in which the touch electrode TE and the touch routing line TL are disposed on the same layer, and the touch electrodes TE are connected by the touch electrode connection pattern CL.

The touch sensor structure may be implemented by, e.g., two or more metal layers and be implemented by a metal layer positioned on the uppermost layer of the display panel 110.

FIG. 8 illustrates an example cross-sectional structure of portion I-I' of FIG. 6.

The substrate SUB may include an active area AA in which a plurality of subpixels SP are disposed and a non-active area NA positioned outside the active area AA.

The active area AA may include an emission area EA in which light is emitted by the light emitting element ED and a non-emission area NEA that is an area other than the emission area EA.

A buffer layer BUF may be disposed on the substrate SUB.

A thin film transistor TFT may be disposed on the buffer layer BUF.

The thin film transistor TFT may include an active layer ACT and a gate electrode GE. The thin film transistor TFT may include a source electrode SE and a drain electrode (not shown).

The active layer ACT may be positioned on the buffer layer BUF. The active layer ACT may be formed of a semiconductor material. The active layer ACT may be formed of amorphous silicon or polycrystalline silicon.

A gate insulation layer GI may be disposed on the active layer ACT.

The gate electrode GE may be positioned on the gate insulation layer GI. The gate electrode GE may be disposed using the first metal layer M1.

Several signal lines may be disposed using the first metal layer M1.

For example, the second power line VSL supplying the second driving voltage VSS may be disposed using the first metal layer M1.

The second power line VSL may be positioned in the non-active area NA. In some cases, the second power line VSL may be positioned in the active area AA.

The second power line VSL may be electrically connected to the second electrode layer E2. A second electrode connection pattern CCP may be positioned in at least a partial area between the second power line VSL and the second electrode layer E2.

A first inter-layer insulation layer ILD1 may be disposed on the gate electrode GE.

A capacitor electrode CE may be positioned on the first inter-layer insulation layer ILD1. The capacitor electrode CE may be disposed using the second metal layer M2.

The capacitor electrode CE may form the gate electrode GE of the first thin film transistor TFT1 and the storage capacitor Cstg. The first thin film transistor TFT1 may be, e.g., the driving transistor DRT shown in FIG. 2.

A second inter-layer insulation layer ILD2 may be disposed on the capacitor electrode CE.

The source electrode SE may be positioned on the second inter-layer insulation layer ILD2. The source electrode SE may be electrically connected to the active layer ACT through a contact hole. The source electrode SE may be disposed using the third metal layer M3.

Several signal lines may be disposed using the third metal layer M3.

For example, the data line DL for supplying the data voltage Vdata may be disposed using the third metal layer M3. The first power line VDL for supplying the first driving voltage VDD may be disposed using the third metal layer M3.

A portion of the first power line VDL may be positioned in the active area AA. In some cases, the first power line VDL may be positioned in the non-active area NA.

The data line DL, the first power line VDL, and the second power line VSL may be disposed in various ways using at least some of several metal layers.

FIG. 8 illustrates an example in which the data line DL and the first power line VDL are disposed using the third metal layer M3, but the data line DL and the first power line VDL may be disposed using the metal layer M1 or the second metal layer M2.

Further, as in the example shown in FIG. 8, the first power line VDL may include a portion formed of the third metal layer M3 and a portion formed of the fourth metal layer M4. Accordingly, the resistance of the first power line VDL may be reduced.

A third inter-layer insulation layer ILD3 may be disposed on the third metal layer M3.

A first planarization layer PAC1 may be disposed on the third inter-layer insulation layer ILD3. The first planarization layer PAC1 may be formed of, e.g., an organic material.

A fourth metal layer M4 may be positioned on the first planarization layer PAC1.

A portion of the first power line VDL may be disposed using the fourth metal layer M4.

A first electrode connection pattern ACP may be disposed using the fourth metal layer M4. The second thin film transistor TFT2 and the light emitting element ED may be electrically connected by the first electrode connection pattern ACP. The second thin film transistor TFT2 may be, e.g., the fourth transistor T4 or the fifth transistor T5 shown in FIG. 2.

A second planarization layer PAC2 may be disposed on the fourth metal layer M4. The second planarization layer PAC2 may be formed of, e.g., an organic material.

A light emitting element ED may be disposed on the second planarization layer PAC2.

The first electrode layer E1 of the light emitting element ED may be positioned on the second planarization layer PAC2.

A bank layer BNK may be disposed on the second planarization layer PAC2 while exposing a portion of the first electrode layer E1.

A light emitting layer EL may be positioned on the first electrode layer E1. A light emitting layer EL may be positioned on a portion of the bank layer BNK.

A second electrode layer E2 may be positioned on the light emitting layer EL and the bank layer BNK.

An emission area EA) may be determined by the bank layer BNK.

An encapsulation layer ENCAP may be disposed on the light emitting element ED. The encapsulation layer ENCAP may be formed of a single layer or multiple layers. For example, the encapsulation layer ENCAP may include a first inorganic layer, an organic layer, and a second inorganic layer.

A touch sensor structure may be disposed on the encapsulation layer ENCAP.

For example, the touch buffer layer TBUF may be positioned on the encapsulation layer ENCAP. The touch buffer layer TBUF may be formed of, e.g., an inorganic material. In some cases, the touch buffer layer TBUF may not be disposed. In this case, electrodes included in the touch sensor structure may be directly disposed on the encapsulation layer ENCAP.

A touch electrode connection pattern CL may be positioned on the touch buffer layer TBUF. For example, a second X-touch electrode external connection pattern X-OCL-2 and a second Y-touch electrode internal connection pattern Y-ICL-2 may be positioned on the birch buffer layer TBUF.

A touch insulation layer TILD may be positioned on the touch electrode connection pattern CL. The touch insulation layer TILD may be an organic material and may also be an inorganic material. When the touch insulation layer TILD is an organic material, a layer formed of an inorganic material may be further disposed between the touch insulation layer TILD and the touch electrode connection pattern CL.

A touch electrode TE may be disposed on the touch insulation layer TILD. For example, the second Y-touch electrode Y-TE-2-11 may be positioned on the touch insulation layer TILD. The second Y-touch electrode Y-TE-2-11 may be positioned while avoiding the emission area EA. Further, although not shown in FIG. 8, the touch routing line TL may be positioned on the touch insulation layer TILD.

A touch protection layer TPAC may be disposed on the touch electrode TE.

Since the touch electrode TE, the touch routing line TL, and the touch electrode connection pattern CL are disposed using a plurality of layers, it is possible to easily implement a touch sensor structure in which the touch electrode TE and the touch routing line TL are disposed on the same layer.

The touch electrode TE and the touch electrode connection pattern CL may be disposed while avoiding the emission area EA. The touch electrode TE and the touch electrode connection pattern CL may overlap the non-emission area NEA.

Since the touch electrode TE and the touch electrode connection pattern CL are disposed on the encapsulation layer ENCAP while avoiding the emission area EA, the touch sensor structure may be included in the display panel 110 without affecting the image display function of the display panel 110.

As such, since the touch sensor structure implemented on the encapsulation layer ENCAP is divided and disposed in a plurality of sub areas SAA, it is possible to provide a touch sensor structure while reducing an increase in load in the large-area display panel 110.

At least some of the touch electrodes TE disposed in different sub areas SAA may be driven by the same touch driving circuit 150.

FIG. 9 is a view illustrating another example of a touch sensor structure included in a touch display device 100 according to embodiments of the disclosure.

FIG. 9 illustrates an example structure in which the touch sensor structure is divided and disposed in eight sub areas SAA1, SAA2, SAA3, SAA4, SAA5, SAA6, SAA7, and SAA8. As described above, the active area AA may be divided into two or more sub areas SAA. The number of sub areas SAA may vary.

The touch electrode TE disposed in each sub area SAA may be electrically divided and disposed.

The first X-touch electrode X-TE-1-11 disposed in the first sub area SAA1 may be connected with the second X-touch electrode X-TE-2-11 disposed in the second sub area SAA2. The first Y-touch electrode Y-TE-1-11 disposed in the first sub area SAA1 may be electrically divided from the second Y-touch electrode Y-TE-2-11 disposed in the second sub area SAA2.

In the structure in which the touch electrodes TE are so disposed, e.g., the first sub area SAA1 and the second sub area SAA2 may constitute a first sensing group SG1. The third sub area SAA3 and the fourth sub area SAA4 may constitute a second sensing group SG2. The fifth sub area SAA5 and the sixth sub area SAA6 may constitute a third sensing group SG3. The seventh sub area SAA7 and the eighth sub area SAA8 may constitute a fourth sensing group SG4.

At least some of the touch electrodes TE included in each sensing group may be driven by the same touch driving circuit 150.

For example, each of the first sensing group SG1, the second sensing group SG2, the third sensing group SG3, and the fourth sensing group SG4 may be driven by a first touch driving circuit 151, a second touch driving circuit 152, a third touch driving circuit 153, and a fourth touch driving circuit 154, respectively.

The first touch driving circuit 151, the second touch driving circuit 152, the third touch driving circuit 153, and the fourth touch driving circuit 154, respectively, may be positioned on, e.g., a first film COF1, a second film COF2, a third film COF3, and a fourth film COF4.

The first film COF1 and the second film COF2 may be connected to a first printed circuit board PCB1. The first touch driving circuit 151 and the second touch driving circuit 152 may be controlled by a first touch controller 161 positioned on the first printed circuit board PCB1. The third film COF3 and the fourth film COF4 may be connected to a second printed circuit board PCB2. The third touch driving circuit 153 and the fourth touch driving circuit 154 may be controlled by a second touch controller 162 positioned on the second printed circuit board PCB2.

The first X-touch electrode X-TE-1-11 of the first sub area SAA1 and the second X-touch electrode X-TE-2-11 of the second sub area SAA2 are electrically connected to each other and driven, so that they may be driven by the same first touch driving circuit 151.

As such, when the touch electrodes TE positioned in different sub areas SAA are electrically connected to each other, the corresponding sub area SAA may be driven by the same touch driving circuit 150, and touch sensing may be performed.

Further, FIG. 9 illustrates an example in which the X-touch electrodes X-TE positioned in two sub areas SAA are electrically connected with each other, but X-touch electrodes X-TEL positioned in three or more sub areas SAA may be electrically connected with each other. In such a case, three or more sub areas SAA where X-touch electrodes X-TE electrically connected with each other are disposed may be driven by the same touch driving circuit 150.

Embodiments of the disclosure described above are briefly described below.

A touch display device 100 according to embodiments of the disclosure may comprise a substrate SUB including an active area AA including a plurality of sub areas SAA and a non-active area NA positioned outside the active area AA, a plurality of light emitting elements ED on the substrate SUB, an encapsulation layer ENCAP on the plurality of light emitting elements ED, a plurality of touch electrodes TE positioned on the encapsulation layer ENCAP and separately disposed in the plurality of sub areas SAA, and a plurality of touch routing lines TL electrically connected with at least one of the plurality of touch electrodes TE. The plurality of sub areas SAA may include a first sub area SAA1 and a second sub area SAA2. At least one of a plurality of first X-touch electrodes X-TE-1 positioned in the first sub area SAA1 may be electrically connected with at least one of a plurality of second X-touch electrodes X-TE-2 positioned in the second sub area SAA2. A plurality of first Y-touch electrodes Y-TE-1 positioned in the first sub area SAA1 may be insulated or electrically separated from a plurality of second Y-touch electrodes positioned in the second sub area SAA2.

The plurality of touch routing lines TL may include a plurality of first X-touch routing lines X-TL-1 having a portion positioned in the active area AA. At least one of the plurality of first X-touch electrodes X-TE-1 and at least one of the plurality of second X-touch electrodes X-TE-2 may be electrically connected by at least one of the plurality of first X-touch routing lines X-TL-1.

The plurality of first X-touch routing lines X-TL-1 may be positioned on a layer where the plurality of first touch electrodes X-TE-1 and the plurality of second X-touch electrodes X-TE-2 may be disposed.

A portion of the first X-touch routing line X-TL-1 may be positioned inside the first X-touch electrode X-TE-1. Another portion of the first X-touch routing line X-TL-1 may be positioned inside the second X-touch electrode X-TE-2.

One of the plurality of first X-touch routing lines X-TL-1 may be electrically connected with another one of the plurality of first X-touch routing lines X-TL-1 in the non-active area NA.

The touch display device 100 may further comprise at least one first X-touch electrode internal connection pattern X-ICL-1 positioned on a layer different from a layer where the first X-touch routing line X-TL-1 is disposed, crossing the first X-touch routing line, and electrically connected with one of the plurality of first X-touch electrodes X-TE-1.

The touch display device 100 may further comprise at least one first X-touch electrode external connection pattern X-OCL-1 positioned on a layer different from a layer where the plurality of first Y-touch electrodes Y-TE-1 are disposed, crossing the plurality of first Y-touch electrodes Y-TE-1, and electrically connected with two or more of the plurality of first X-touch electrodes X-TE-1.

At least one of a shape or area of at least one first X-touch electrode X-TE-1 adjacent to a boundary of the first sub area SAA1 among the plurality of first X-touch electrodes X-TE-1 may be different from a shape or area of at least one first X-touch electrode X-TE-1 positioned in a center of the first sub area SAA1 among the plurality of first X-touch electrodes X-TE-1.

The area of the at least one first X-touch electrode X-TE-1 adjacent to the boundary of the first sub area SAA1 may be smaller than the area of the at least one first X-touch electrode X-TE-1 positioned in the center of the first sub area SAA1.

The plurality of touch routing lines TL may include a plurality of first Y-touch routing lines Y-TL-1 and a plurality of second Y-touch routing lines Y-TL-2. Each of the plurality of first Y-touch routing lines Y-TL-1 may be electrically connected with a respective one of the plurality of first Y-touch electrodes Y-TE-1. Each of the plurality of second Y-touch routing lines Y-TL-2 may be electrically connected with a respective one of the plurality of second Y-touch electrodes Y-TE-2. A portion of each of the plurality of first Y-touch routing lines Y-TL-1 may be positioned in the second sub area SAA2. A portion of each of the plurality of second Y-touch routing lines Y-TL-2 may be positioned in the first sub area SAA1.

The plurality of first Y-touch routing lines Y-TL-1 and the plurality of second Y-touch routing lines Y-TL-2 may be positioned on a layer where the plurality of first Y-touch electrodes Y-TE-1 and the plurality of second Y-touch electrodes Y-TE-2 are disposed.

A portion of each of the plurality of first Y-touch routing lines Y-TL-1 may be positioned inside each of the plurality of second Y-touch electrodes Y-TE-2. A portion of each of the plurality of second Y-touch routing lines Y-TL-2 may be positioned inside each of the plurality of first Y-touch electrodes Y-TE-1.

The touch display device 100 may further comprise at least one first Y-touch electrode internal connection pattern Y-ICL-1 positioned on a layer different from a layer where the plurality of first Y-touch routing lines Y-TL-1 are disposed, crossing the plurality of first Y-touch routing lines Y-TL-1, and electrically connected with the plurality of first Y-touch electrodes Y-TE-1, respectively.

A touch display device 100 according to embodiments of the disclosure may comprise a plurality of first X-touch electrodes X-TE-1 and a plurality of first Y-touch electrodes Y-TE-1 positioned in a first sub area SAA1, and a plurality of second X-touch electrodes X-TE-2 and a plurality of second Y-touch electrodes Y-TE-2 positioned in a second sub area SAA2 adjacent to the first sub area SAA1. At least one of the plurality of first X-touch electrodes X-TE-1 may be electrically connected with at least one of the plurality of second X-touch electrodes X-TE-2. The plurality of first Y-touch electrodes Y-TE-1 may be insulated from the plurality of second Y-touch electrodes Y-TE-2.

The at least one of the plurality of first X-touch electrodes X-TE-1 and the at least one of the plurality of second X-touch electrodes X-TE-2 may be electrically connected by a first X-touch routing line X-TL-1 positioned in the first sub area SAA1 and the second sub area SAA2.

Each of the plurality of first Y-touch electrodes Y-TE-1 may be electrically connected with the first Y-touch routing line Y-TL-1 positioned in the first sub area SAA1 and the second sub area SAA2. Each of the plurality of second Y-touch electrodes Y-TE-2 may be electrically connected with a second Y-touch routing line Y-TL-2 positioned in the first sub area SAA1 and the second sub area SAA2.

A touch display device 100 according to embodiments of the disclosure may comprise a substrate SUB including an active area AA where a plurality of subpixels SP are disposed and a non-active area NA positioned outside the active area AA, a plurality of light emitting elements ED on the substrate SUB, an encapsulation layer ENCAP on the plurality of light emitting elements ED, a plurality of touch electrodes TE on the encapsulation layer ENCAP, and a plurality of touch routing lines TL electrically connected with at least one of the plurality of touch electrodes TE and having a portion positioned in the active area AA. The plurality of touch routing lines TL may include a plurality of first touch routing lines electrically connected with two or more among the plurality of touch electrodes TE and a plurality of second touch routing lines electrically connected with one of the plurality of touch electrodes. One of the plurality of first touch routing lines may be electrically connected with at least another one of the plurality of first touch routing lines in the non-active area NA, and the plurality of second touch routing lines may be electrically separated from each other.

A plurality of first touch routing lines and a plurality of second touch routing lines may be positioned on a layer where a plurality of touch electrodes TE are disposed in the active area AA.

At least one of the plurality of first touch routing lines may cross at least one of the plurality of second touch routing lines in the non-active area NA.

In an aspect, the disclosure also provides a method of forming the structures, e.g., shown in one or more of FIGS.

4-9. For example, a plurality touch electrodes are formed over a wafer or body. The body already has a plurality of light emitting elements formed on an active area of a substrate, and has an encapsulation layer formed on the plurality of light emitting elements. The plurality of touch electrodes are formed on the encapsulation layer. The plurality of touch electrodes include a first plurality of touch electrodes in a first sub area of the active area and a second plurality of touch electrodes in a second sub area of the active areas. The first plurality of touch electrodes include first X-touch electrodes arranged along the X-direction and first Y-touch electrode arranged along the Y-direction. The second plurality of touch electrodes including second X-touch electrodes arranged along the X-direction and second Y-touch electrodes arranged along the Y-direction.

X-touch routing lines are formed extending from the first X-touch electrodes to the second X-touch electrodes. Each X-touch routing line is connected to at least one first X-touch electrode and at least one second X-touch electrode.

Y-touch routing lines are formed extending from the first Y-touch electrodes to the second Y-touch electrodes. Each Y-touch routing line is connected to either a first Y-touch electrode or a second Y-touch electrode, but not both. That is, in a case that a Y-touch routing line is connected to a first Y-touch electrode, the Y-touch routing line will be electrically separated from any second Y-touch electrodes. In a case that a Y-touch routing line is connected to a second Y-touch electrode, the Y-touch routing line will be electrically separated from any first Y-touch electrodes.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the disclosure.

The various embodiments described above can be combined to provide further embodiments. Aspects of the embodiments can be modified, if necessary to employ concepts of various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
a substrate including an active area including a plurality of sub areas and configured to allow images to be displayed, and a non-active area positioned outside the active area and configured not to allow images to be displayed;
a plurality of light emitting elements on the substrate;
an encapsulation layer on the plurality of light emitting elements;
a plurality of touch electrodes disposed in the active area, positioned on the encapsulation layer, and separately disposed in the plurality of sub areas;
a plurality of touch routing lines each electrically connected with at least one of the plurality of touch electrodes; and
at least one first X-touch electrode external connection structure positioned on a layer different from a layer where the plurality of first Y-touch electrodes are disposed, each crossing at least one of the plurality of first Y-touch electrodes, and each electrically connected with two or more of the plurality of first X-touch electrodes,
wherein the plurality of sub areas include a first sub area and a second sub area,
wherein at least one of a plurality of first X-touch electrodes positioned in the first sub area is electrically connected with at least one of a plurality of second X-touch electrodes positioned in the second sub area, and
wherein a plurality of first Y-touch electrodes positioned in the first sub area are each electrically separated from a plurality of second Y-touch electrodes positioned in the second sub area.

2. The touch display device of claim 1, wherein the plurality of touch routing lines include a plurality of first X-touch routing lines each having a portion positioned in the active area, and
wherein at least one of the plurality of first X-touch electrodes and at least one of the plurality of second X-touch electrodes are electrically connected by at least one of the plurality of first X-touch routing lines.

3. The touch display device of claim 2, wherein the plurality of first X-touch routing lines are positioned on a layer where the plurality of first X-touch electrodes and the plurality of second X-touch electrodes are disposed.

4. The touch display device of claim 2, wherein a first portion of each of the at least one of the plurality of first X-touch routing lines is positioned inside the first X-touch electrode, and a second portion of each of the at least one of the plurality of first X-touch routing lines is positioned inside the second X-touch electrode.

5. The touch display device of claim 2, wherein a first one of the plurality of first X-touch routing lines is electrically connected with a second one of the plurality of first X-touch routing lines in the non-active area.

6. A touch display device comprising:
a substrate including an active area including a plurality of sub areas and configured to allow images to be displayed, and a non-active area positioned outside the active area and configured not to allow images to be displayed;
a plurality of light emitting elements on the substrate;
an encapsulation layer on the plurality of light emitting elements;
a plurality of touch electrodes disposed in the active area, positioned on the encapsulation layer, and separately disposed in the plurality of sub areas; and
a plurality of touch routing lines each electrically connected with at least one of the plurality of touch electrodes;
wherein the plurality of touch routing lines include a plurality of first X-touch routing lines each having a portion positioned in the active area, wherein at least one of the plurality of first X-touch electrodes and at least one of the plurality of second X-touch electrodes are electrically connected by at least one of the plurality of first X-touch routing lines, wherein at least one first X-touch electrode internal connection structure is positioned on a layer different from a layer where the first X-touch routing line is disposed, crossing the first X-touch routing line, and electrically connected with one of the plurality of first X-touch electrodes.

7. The touch display device of claim 1, wherein at least one of a shape or area of at least one first X-touch electrode adjacent to a boundary of the first sub area among the plurality of first X-touch electrodes is different from a shape or area of at least one first X-touch electrode positioned in a center of the first sub area among the plurality of first X-touch electrodes.

8. The touch display device of claim 7, wherein the area of the at least one first X-touch electrode adjacent to the boundary of the first sub area is smaller than the area of the at least one first X-touch electrode positioned in the center of the first sub area.

9. The touch display device of claim 1, wherein the plurality of touch routing lines include a plurality of first Y-touch routing lines and a plurality of second Y-touch routing lines, wherein each of the plurality of first Y-touch routing lines is electrically connected with a respective one of the plurality of first Y-touch electrodes, and each of the plurality of second Y-touch routing lines is electrically connected with a respective one of the plurality of second Y-touch electrodes, and wherein a portion of each of the plurality of first Y-touch routing lines is positioned in the second sub area, and a portion of each of the plurality of second Y-touch routing lines is positioned in the first sub area.

10. The touch display device of claim 9, wherein the plurality of first Y-touch routing lines and the plurality of second Y-touch routing lines are positioned on a layer where the plurality of first Y-touch electrodes and the plurality of second Y-touch electrodes are disposed.

11. The touch display device of claim 9, wherein a portion of each of the plurality of first Y-touch routing lines is positioned inside a second Y-touch electrode of the plurality of second Y-touch electrodes, and a portion of each of the plurality of second Y-touch routing lines is positioned inside a first Y-touch electrode of the plurality of first Y-touch electrodes.

12. The touch display device of claim 9, further comprising:

at least one first Y-touch electrode internal connection structure positioned on a layer different from a layer where the plurality of first Y-touch routing lines are disposed, each crossing one or more of the plurality of first Y-touch routing lines, and each electrically connected with one or more the plurality of first Y-touch electrodes, respectively.

13. A touch display device, comprising:

a substrate including an active area, the active area including a first sub area and a second sub area;

a plurality of light emitting elements on the active area of the substrate;

an encapsulation layer on the plurality of light emitting elements;

a first plurality of touch electrodes positioned on the encapsulation layer and in the first subarea, the first plurality of touch electrodes including a first X-touch electrode arranged along a first direction and a first Y-touch electrode arranged along a second direction different from the first direction;

a second plurality of touch electrodes positioned on the encapsulation layer and in the second subarea, the second plurality of touch electrodes including a second X-touch electrode arranged along the first direction and a second Y-touch electrode arranged along the second direction;

a first touch routing line that extends through an opening within the first X-touch electrode and an opening within the second X-touch electrode, the first touch routing line in connection with the first X-touch electrode and the second X-touch electrode; and a second touch routing line that extends through an opening within the first Y-touch electrode and an opening within the second Y-touch electrode, the second touch routing line in connection with the first Y-touch electrode and is electrically separated from any Y-touch electrode positioned in the second sub area.

14. The touch display device of claim 13, wherein the first X-touch electrode includes a first part and a second part, and the first touch routing line extends in the opening between the first part and the second part.

15. The touch display device of claim 14, wherein the opening extends through an entire dimension of the first X-touch electrode in the second direction.

16. The touch display device of claim 14, comprising a connection structure positioned on a layer different from a layer where the first touch routing line is disposed, the connection structure in connection with both the first part and the second part of the first X-touch electrode.

17. The touch display device of claim 13, wherein the first X-touch electrode has a first dimension in the second direction, the first Y-touch electrode has a second dimension in the second direction, the second dimension greater than the first dimension.

18. The touch display device of claim 13, wherein the first plurality of touch electrodes include a third X-touch electrode and a third Y-touch electrode, the first Y-touch electrode being arranged between the first X-touch electrode and the third X-touch electrode along the first direction, and the third X-touch electrode being arranged between the first Y-touch electrode and the third Y-touch electrode along the first direction, and wherein the first X-touch electrode is connected to the third X-touch electrode via a connection structure.

19. The touch display device of claim 13, comprising a third plurality of touch electrodes positioned on the encapsulation layer and in a third subarea, the third plurality of touch electrodes including a third X-touch electrode arranged along the first direction and a third Y-touch electrode arranged along the second direction, wherein the first subarea and the second subarea are adjacent to one another along the second direction, and the first subarea and the third subarea are adjacent to one another along the first direction, and wherein the first X-touch electrode and the third X-touch electrode are connected to one another via a connection structure.

* * * * *